(12) United States Patent
McCollum

(10) Patent No.: US 7,676,560 B2
(45) Date of Patent: Mar. 9, 2010

(54) USING URI'S TO IDENTIFY MULTIPLE INSTANCES WITH A COMMON SCHEMA

(75) Inventor: Raymond W. McCollum, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 1334 days.

(21) Appl. No.: 10/693,588

(22) Filed: Oct. 24, 2003

(65) Prior Publication Data

US 2005/0114485 A1   May 26, 2005

(51) Int. Cl.
*G06F 15/173* (2006.01)
*G06F 9/44* (2006.01)

(52) U.S. Cl. ........................ 709/223; 717/167
(58) Field of Classification Search ................. 709/223; 717/127, 130; 714/47
See application file for complete search history.

(56) References Cited

U.S. PATENT DOCUMENTS

| | | | |
|---|---|---|---|
| 5,732,234 A | 3/1998 | Vassiliadis et al. | |
| 5,878,418 A | 3/1999 | Polcyn | |
| 5,920,873 A | 7/1999 | Van Huben et al. | |
| 6,012,152 A | 1/2000 | Douik et al. | |
| 6,067,548 A | 5/2000 | Cheng | |
| 6,085,030 A | 7/2000 | Whitehead et al. | |
| 6,088,451 A | 7/2000 | He | |
| 6,138,168 A | 10/2000 | Kelly et al. | |
| 6,212,581 B1 | 4/2001 | Graf | |
| 6,219,666 B1 | 4/2001 | Krishnaswamy et al. | |
| 6,473,895 B1 * | 10/2002 | Lopes et al. | 717/128 |
| 6,477,572 B1 | 11/2002 | Elderton et al. | |
| 6,553,387 B1 | 4/2003 | Cabrera et al. | |
| 6,598,060 B2 | 7/2003 | Goldick | |
| 6,635,088 B1 * | 10/2003 | Hind et al. | 715/236 |
| 6,678,889 B1 | 1/2004 | Burkett | |
| 6,684,231 B1 | 1/2004 | Cabrera et al. | |
| 6,754,664 B1 * | 6/2004 | Bush | 709/223 |
| 6,865,593 B1 * | 3/2005 | Reshef et al. | 709/203 |
| 6,871,344 B2 | 3/2005 | Grier | |
| 7,266,814 B2 * | 9/2007 | Bosworth et al. | 717/166 |
| 7,287,247 B2 | 10/2007 | Gschwind | |
| 2002/0019870 A1 | 2/2002 | Chirashnya et al. | |
| 2002/0029374 A1 | 3/2002 | Moore | |
| 2002/0049715 A1 | 4/2002 | Serrano-Morales et al. | |
| 2002/0059425 A1 | 5/2002 | Belfiore et al. | |
| 2002/0133535 A1 | 9/2002 | Lucovsky et al. | |

(Continued)

OTHER PUBLICATIONS

International Search Report dated Oct. 14, 2005 mailed Dec. 2, 2005 for PCT Application Serial No. PCT/US04/22378, 6 pages.

(Continued)

*Primary Examiner*—Benjamin R Bruckart
(74) *Attorney, Agent, or Firm*—Workman Nydegger

(57) ABSTRACT

A system that uses a Uniform Resource Identifier (URI) to uniquely identify a class of resources. The schema uses a URI with a placeholder substituted for the resource name, effectively creating a URI template. Processing of the URI template facilitates retrieval of resource class information. If specificity is required, the URI template can be converted to a specific URI by replacing the placeholder with the name of a given resource or instance to get information about that particular instance. URI templates allow probes to be identified and the probe characteristics to be understood without actually retrieving the probe for a particular instance.

16 Claims, 14 Drawing Sheets

U.S. PATENT DOCUMENTS

| | | | |
|---|---|---|---|
| 2002/0147726 A1 | 10/2002 | Yehia et al. | |
| 2002/0174125 A1 | 11/2002 | Lucovsky et al. | |
| 2003/0028642 A1* | 2/2003 | Agarwal et al. | 709/226 |
| 2003/0131343 A1* | 7/2003 | French et al. | 717/127 |
| 2003/0135628 A1 | 7/2003 | Fletcher et al. | |
| 2003/0143509 A1 | 7/2003 | Kopelman | |
| 2003/0145309 A1* | 7/2003 | Inamdar | 717/118 |
| 2003/0177109 A1 | 9/2003 | Cabrera et al. | |
| 2003/0220993 A1 | 11/2003 | Blizniak | |
| 2004/0010716 A1* | 1/2004 | Childress et al. | 713/201 |
| 2004/0031038 A1 | 2/2004 | Hugly et al. | |
| 2004/0034853 A1 | 2/2004 | Gibbons | |
| 2004/0068720 A1 | 4/2004 | Hundt | |
| 2004/0083454 A1 | 4/2004 | Bigus et al. | |
| 2004/0111638 A1 | 6/2004 | Yadav et al. | |
| 2004/0133656 A1 | 7/2004 | Butterworth | |
| 2004/0181541 A1 | 9/2004 | Groenendaal et al. | |
| 2004/0260819 A1* | 12/2004 | Trossen | 709/229 |
| 2005/0021530 A1 | 1/2005 | Garg | |
| 2005/0091647 A1 | 4/2005 | McCollum | |
| 2005/0097146 A1 | 5/2005 | Konstantinou et al. | |
| 2005/0172306 A1 | 8/2005 | Agarwal et al. | |

OTHER PUBLICATIONS

T. Berners-Lee et al., Uniform Resource Identifiers (URI): Generic Syntax, Network Working Group, Aug. 1998, pp. 1-38.

A. Lin, A New Model-Based Automated Diagnosis Algorithm, Feb. 1998, pp. 1-6.

B. Ravindran, Engineering Dynamic Real-Time Distributed Systems: Architecture, System Description Language, and Middleware, IEEE Transactions on Software Engineering, Jan. 2002, pp. 30-57, vol. 28, No. 1.

T. Roscoe et al., InfoSpect: Using A Logic Language for System Health Monitoring in Distributed Systems, Proceedings of the SIGOPS European Workshop, Sep. 2002, pp. 1-7, Saint-Emilion, France.

F. Steimann et al., Modela Based Diagnosis for Open Systems Fault Management, AI Communications, 1999, 12 pages.

V. Sugumaran et al., A Semantic-Based Approach to Component Retrieval, The Data Base for Advances in Information Systems, pp. 8-24, Summer 2003, vol. 34, No. 3.

International Search Report dated Feb. 15, 2005 mailed Mar. 4, 2005 for PCT Application Serial No. PCT/US04/22275, 5 pages.

Hewlett-Packard, Event Correlation Services Designer Overview & Features, viewed at http://www.openview.hp.com/products/ovocd/index.html, 1994-2003,2 pages.

Hewlett-Packard, Event Correlation Services Designer's Guide, HP OpenView, pp. 1-236, Sep. 1998.

IBM Corporation, Rule Builder's Guide, Version 3.8, pp. 1-450, 2002.

Computer Associates International, Inc., Using the Performance Neugent Guide, 1999-2000, 99 pages.

Computer Associates International, Inc., Working with Neugenis Guide, 1999, 35 pages.

J. Kunze, Functional Recommendations for Internet Resource Locators, http://www.ietf.org/rfc/rfc1736.txt, Feb. 1995, 10 pages.

T. Berners-Lee, Uniform Resource Identifiers (URI): Generic Syntax, http://www.ietf.org/rfc/rfc1736.txt, Aug. 1998, 40 pages, The Internet Society.

K. Sollins, Functional Requirements for Uniform Resource Names, http://www.ictf.org/rfc/rfc1736.txt, Dec. 1994, 7 pages.

Frank Manola, et al., RDF Primer W3C Working Draft Oct. 10, 2003, W3C, pp. 1-119.

Able: A Toolkit for Building Multiagent Autonomic Systems, IBM Systems Journal vol. 41, No. 3, 2002 pp. 350-371.

Beemster; "Back-end Aspects of a portable POOL-X implementation;" Faculty of Mathematics and Computer Science University of Amsterdam; pp. 193-228; 1990.

International Search Report dated Jul. 3, 2008 for PCT Application Serial No. PCT/US04/24134, 2 Pages.

Office Action dated May 16, 2008 cited in U.S. Appl. No. 10/693,072.

Notice of Allowance dated Jan. 16, 2009 cited in U.S. Appl. No. 10/693,072.

Office Action dated Oct. 10, 2007 cited in U.S. Appl. No. 10/692,432.

Office Action dated May 2, 2008 cited in U.S. Appl. No. 10/692,432.

Office Action dated Oct. 1, 2008 cited in U.S. Appl. No. 10/692,432.

Office Action dated Apr. 6, 2009 cited in U.S. Appl. No. 10/692,432.

Office Action dated Apr. 9, 2008 cited in U.S. Appl. No. 10/943,452.

Office Action dated Oct. 20, 2008 cited in U.S. Appl. No. 10/943,452.

Office Action dated May 28, 2009 cited in U.S. Appl. No. 10/943,452.

\* cited by examiner

USING URI'S TO IDENTIFY MULTIPLE INSTANCES WITH A COMMON SCHEMA

CROSS-REFERENCE TO RELATED APPLICATIONS

This application is related to the following co-pending U.S. patent applications: U.S. Pat. No. 7,103,874 entitled "MODEL-BASED MANAGEMENT OF COMPUTER SYSTEMS AND DISTRIBUTED APPLICATIONS" filed on Oct. 23, 2003; U.S. Publication No. 20050114494 entitled "SCALABLE SYNCHRONOUS AND ASYNCHRONOUS PROCESSING OF MONITORING RULES" filed on Oct. 24, 2003; U.S. Publication No. 20050091640 entitled "RULES DEFINITION LANGUAGE" filed on Oct. 24, 2003; and, U.S. Publication No. 20050091635 entitled "USE OF ATTRIBUTION TO DESCRIBE MANAGEMENT INFORMATION" filed on Oct. 23, 2003.

TECHNICAL FIELD

This invention is related to software identifiers, and more specifically, to uniform resource identifiers.

BACKGROUND OF THE INVENTION

Traditional systems management is largely ad-hoc. Application developers do not have a structured framework for managing applications and hardware while achieving high reliability. Systems can include a number of abstract and/or physical resources in the form of software and hardware. However, there is no way to identify a class or category of resources that all have common characteristics. Such a mechanism is important when trying to discover the resources. For example, an administrator may want to learn what kind of information is available about disk drives without needing to know how many drives are actually available on any given computer or the drive names in order to access such information.

What is needed is an improved mechanism for identifying system resources.

SUMMARY OF THE INVENTION

The following presents a simplified summary of the invention in order to provide a basic understanding of some aspects of the invention. This summary is not an extensive overview of the invention. It is not intended to identify key/critical elements of the invention or to delineate the scope of the invention. Its sole purpose is to present some concepts of the invention in a simplified form as a prelude to the more detailed description that is presented later.

The present invention disclosed and claimed herein, in one aspect thereof, comprises the use of Uniform Resource Identifiers (URIs) to uniquely identify classes of resources. A schema for a resource can be identified using a URI with a placeholder substituted for the resource name, effectively creating a URI template. If specificity is required, this URI template can be converted to a specific URI by replacing the placeholder with the name of a given resource or instance to get information about that particular instance. URI templates allow probes to be identified and the probe characteristics to be understood without actually retrieving the probe for a particular instance. URIs can also be used to uniquely identify an abstract or physical resource or collection of resources.

In another aspect of the invention, the underscore character ('_') is chosen to represent an instance placeholder within the URI.

In still another aspect thereof, the URI contains multiple placeholders. This feature is utilized when multiple keys are needed to reach out to a particular instance, such as identifying a given table within a given database.

To the accomplishment of the foregoing and related ends, certain illustrative aspects of the invention are described herein in connection with the following description and the annexed drawings. These aspects are indicative, however, of but a few of the various ways in which the principles of the invention may be employed and the present invention is intended to include all such aspects and their equivalents. Other advantages and novel features of the invention may become apparent from the following detailed description of the invention when considered in conjunction with the drawings.

DETAILED DESCRIPTION OF THE INVENTION

Figure 1:
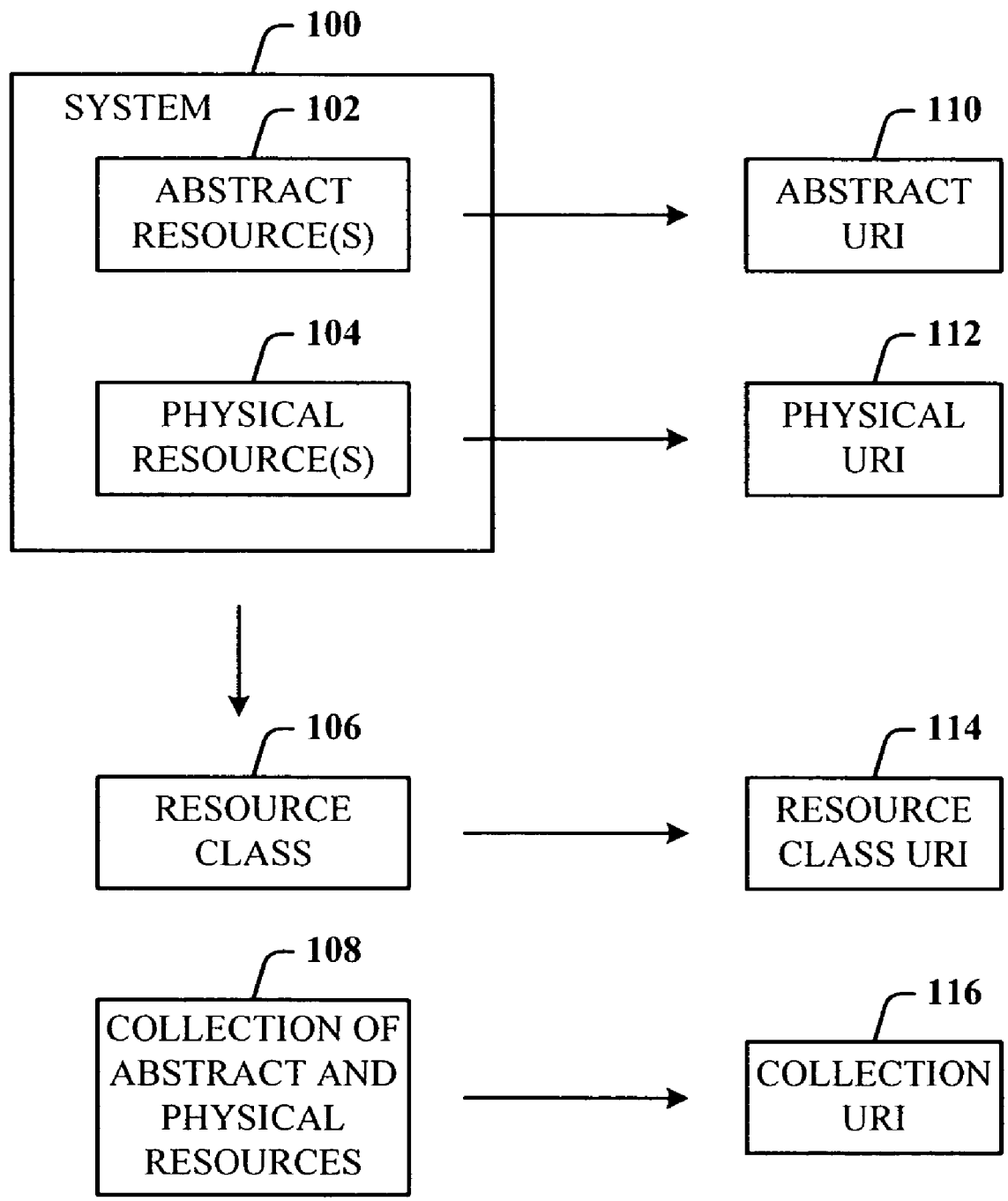
FIG. 1 illustrates a block representation of the unique identifier architecture of the present invention.

The present invention is now described with reference to the drawings, wherein like reference numerals are used to refer to like elements throughout. In the following description, for purposes of explanation, numerous specific details are set forth in order to provide a thorough understanding of the present invention. It may be evident, however, that the present invention may be practiced without these specific details. In other instances, well-known structures and devices are shown in block diagram form in order to facilitate describing the present invention.

As used in this application, the terms "component" and "system" are intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers.

Referring now to FIG. 1, there is illustrated a block representation of the unique identifier architecture of the present invention. A system 100 typically includes a number of resources that include one or more abstract resources 102 and/or one or more physical resources 104. In the disclosed implementation, an identifier in the form of a URI (Uniform Resource Identifier) is used to map to the specific type of resource (102 or 104), class of resources 106, or collection of the resources 108. Here, a specific abstract URI 110 is mapped to the abstract resource 102, a specific physical URI 112 is mapped to the physical resource 104, a resource class URI 114 is mapped to the resource class 106, and a collection URI 116 is mapped to the collection of resources 108.

One implementation of the disclosed URI architecture includes instrumentation catalogs, which is an instrumentation description resource at the heart of a monitoring system. Protecting the capability to pre-define instrumentation separately from instances makes the deployment and authoring of monitoring rules easier, and is important in making a manageable operating system (OS). For example, the schema for disk drives can be identified by the class URI 114 with a placeholder for the actual drive name, i.e., a URI template. The instrumentation catalog can rely on URI templates to describe instrumentation without referring to specific instances. This template can be converted to a specific URI (e.g., URI 110 or URI 112) by replacing the placeholder with the name of a given drive to get information about that particular instance.

Class URI templates 114 allow probes (health management information) to be identified and characteristics understood without actually retrieving the probe for a particular instance. Class URIs use placeholders for instance identifiers. The underscore ('_') character is chosen to represent the placeholder within the class URI. However, any suitable non-conflicting character can be used. Additionally, class URIs can contain multiple placeholders when multiple keys are needed to get to a particular instance such as identifying a given table within a given database.

Figure 2:
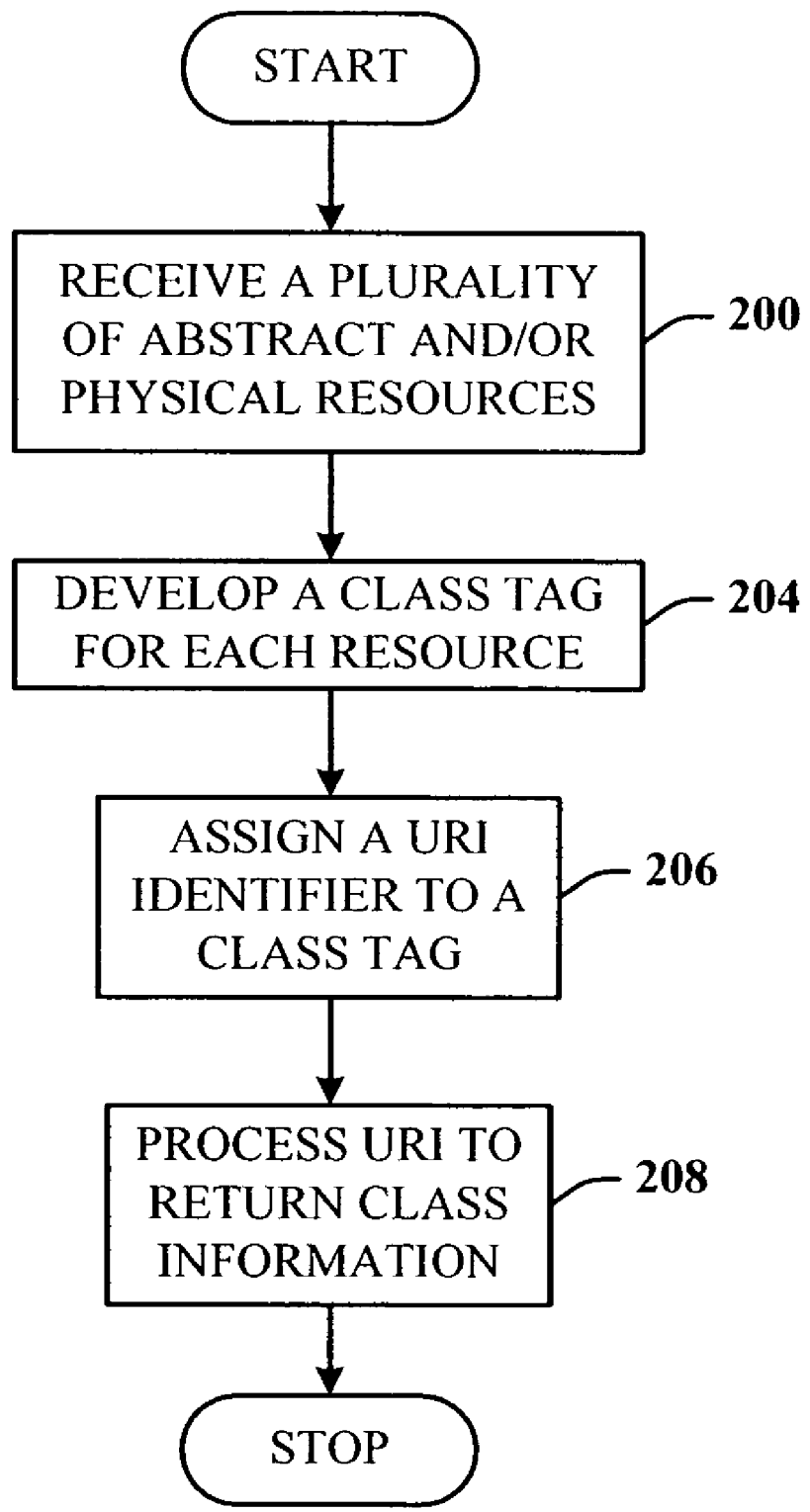
FIG. 2 illustrates a flow chart of a process for utilizing the resource class identifier of the present invention.

Referring now to FIG. 2, there is illustrated a flow chart of a process for utilizing the resource class identifier of the present invention. While, for purposes of simplicity of explanation, the one or more methodologies shown herein, e.g., in the form of a flow chart, are shown and described as a series of acts, it is to be understood and appreciated that the present invention is not limited by the order of acts, as some acts may, in accordance with the present invention, occur in a different order and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the present invention.

At 200, the user determines the available abstract and physical resources of the system. At 204, the resources are tagged according to particular classes of resources, e.g., drives. At 206, a class URI is assigned with a unique resource class representation. At 208, the resource class URI is processed to return class information about the class of resources. The process then reaches a Stop block.

The following example shows a class URI template for identifying a class of logical disk drives. The template is:

System/Drive/Name=__

Each entry for a template in the instrumentation catalog includes information about its purpose, usage, what values should be used for placeholders, and what the returned value looks like:

```
<Uri name='#System/Drive/Name=__'>
    <Description> Returns logical drive information for the
specified drive </Description>
    <UriHelp>
        <__1>The drive letter of the logical drive in the following
format: [Drive letter]:\ </__1>
        <Example> #System/Drive/Name=c:\ </Example>
    </UriHelp>
    <returnValue model="xsd">
        <xs:schema elementFormDefault="qualified"
xmlns:xs="http://www.w3.org/2001/XMLSchema">
            <xs:element name="Drive" nillable="
true" type="Drive" />
                <xs:complexType name="Drive">
                    <xs:sequence>
                        <xs:element minOccurs="0" max-
Occurs="1"
name="VolumeLabel" type="xs:string" />
                        <xs:element minOccurs="1" maxOccurs="1"
name="SectorsPerCluster" type="xs:int" />
                        <xs:element minOccurs="1" maxOccurs="1"
name="BytesPerSector" type="xs:int" />
                        <xs:element minOccurs="1" maxOccurs="1"
name="FreeClusters" type="xs:int" />
                        <xs:element minOccurs="1" maxOccurs="1"
name="TotalClusters" type="xs:int" />
                        <xs:element minOccurs="1" maxOccurs="1"
name="PercentFree" type="xs:int"
                        <xs:element minOccurs="0" maxOccurs="1"
name="DriveName" type="xs:string" />
                    </xs:sequence>
                </xs:complexType>
            </xs:schema>
    </returnValue>
/Uri>
```

Information about a specific drive can then be retrieved by filling in the place holder for a given drive following the instructions for the URI template in the catalog. Thus for the C drive, the following URI,

System/Drive/Name=C:\ yields information consistent with the schema associated with the following URI template.

```
<Drive>
    <VolumeLabel>NEW2</VolumeLabel>
    <SectorsPerCluster>8</SectorsPerCluster>
    <BytesPerSector>512</BytesPerSector>
    <FreeClusters>274278</FreeClusters>
    <TotalClusters>2620603</TotalClusters>
    <PercentFree>10</PercentFree>
    <DriveName>C:\</DriveName>
</Drive>
```

The use of placeholders can be applied to other situations besides just retrieving information about instances. Place holders can also be used to pass values to methods associated with the instances. For example, the following URI template describes how to set the volume label on a drive,

System/Drive/Name=_/VolumeLabel=_ where the first underscore ('_') is the drive letter of the drive to be modified, and the second underscore ('_') is the new volume label.

As a second example, the following URI template describes how to invoke the format method on a drive:

System/Drive/Name=_/Format(blocksize=_,quick=_)

In this case, there are multiple parameters to the format method each indicated with '_'s.

Probes are identified using URIs within an administrator namespace. These URIs may be different than the internal development names for the component. Probes can identify instances of a type, and this is captured within the probe by using a place holder (such as '_') to indicate where the instance identity must be supplied. In the decoupled case, the developer also adds a register call and an unregister call, on startup and shutdown, to notify the system that it is available to answer probes. Beyond this, there is no additional work on the part of the developer to deal with inter-process communication.

Figure 3:
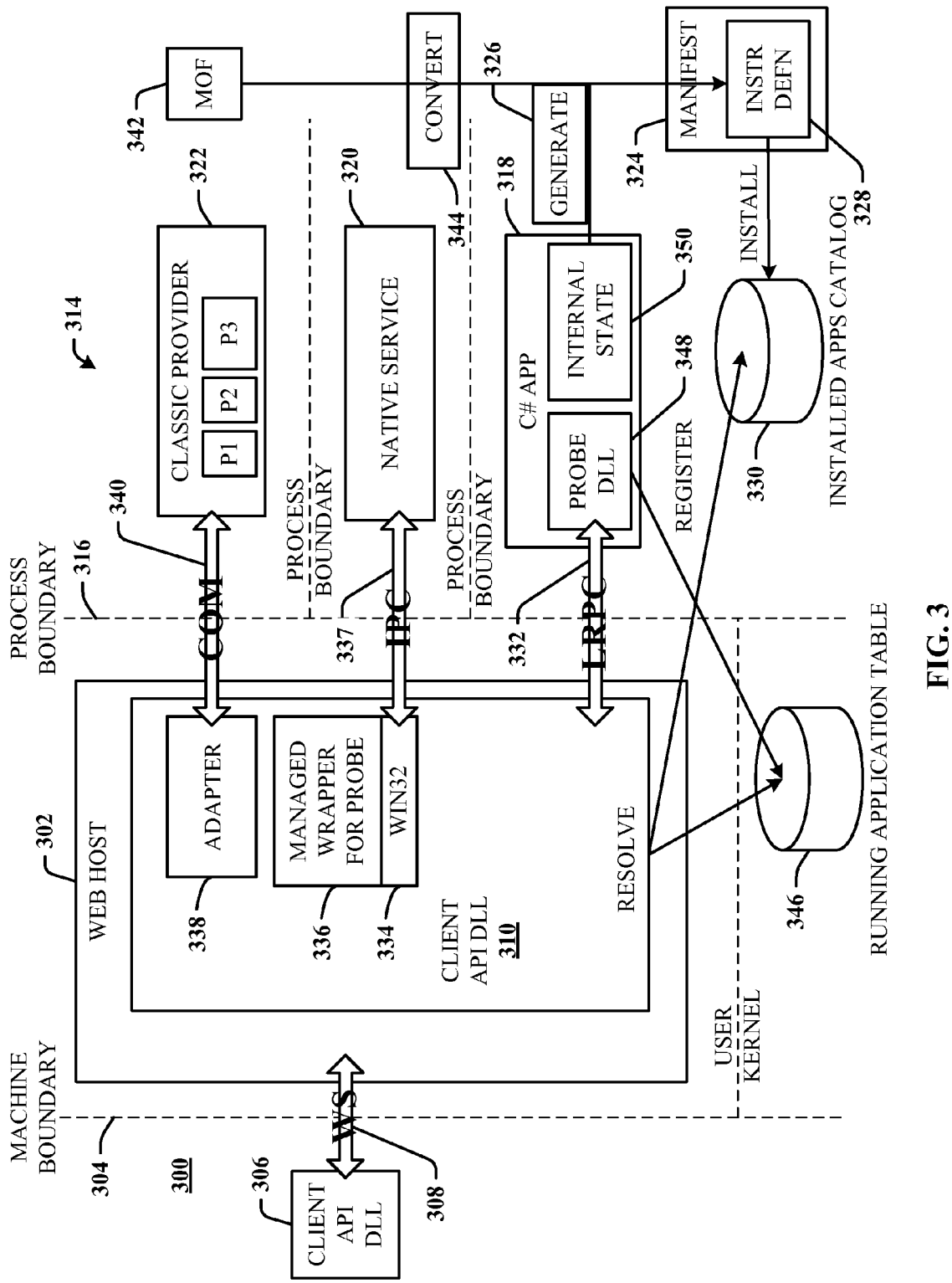
FIG. 3 illustrates a block diagram of a system where an instrumentation catalog is generated using attribution and the URI architecture of the present invention.

Referring now to FIG. 3, there is illustrated a block diagram of a system where an instrumentation catalog is generated using attribution and the URI architecture of the present invention. There is provided a client 300 and a web host 302 demarcated by a machine boundary 304. The client 300 includes a software client API DLL (Dynamic Link Library) 306, which is an executable program module that facilitates communication 308 (e.g., web services, denoted as WS) with the web host 302. The web host 302 includes a host client API DLL 310 that facilitates communication with a number of resident processes 314 (also called providers). The host client API 310 can interface to the respective providers 314 in a number of ways, which provider processes 314 are demarcated from the web host 302 by a demarcation line 316. The separate host providers 314 include a programming language application provider 318 (e.g., C#), a native service provider 320, and a classic provider 322. Note, however, that the application provider 318 can be any suitable programming application.

The description includes both an authoring phase and a runtime phase. During the authoring phase, an application or service provider is prepared (or authored) by attribution of the management information for use during the runtime phase. The application or service is authored using the application 318. The application 318 applies at least type information to the code according to predetermined criteria used to stipulate which areas of the code are deemed to be important for determining the health of the application. A software tool is then applied to the attributed code that sweeps the code for all attributed information and generates an instrumentation manifest 324 for that application, as indicated by a generate process 326. The instrumentation manifest 324 includes probe definitions 328. The manifest 324 is then installed into an installed applications catalog 330 that includes a collection (or catalog) of instrumentation manifests generated for the various applications and services that are installed on the host system 302. Programs interested in the health information and accessing the host 302, e.g., the client DLL 306, can further access the linking process 330 through the host client DLL 310 to obtain the instrumentation definitions 328 of all applications installed on the host system 302.

At runtime, the client DLL 306 (or consumer of health information) that wants to determine something about the health of one or more applications accesses the web host 302 using the connection protocol 308 to access the web host client DLL 310, which in turn communicates with the application 318 via a Local RPC (Local Remote Procedure Call) channel 332. The host client DLL 310 retrieves the health information and returns it to the client 306.

There are several different provider scenarios that can be addressed, which include the application provider 318 that was just described, the native service provider 320, and the classic provider 322. The native service 320 is written in unmanaged code (or native code). Thus, managed code needs to be "wrapped" around the native code such that the native service 320 can be suitable for management in accordance with the present invention. The native service 320 communicates with the host DLL 310 using WIN32 calls 334 over an IPC (InterProcess Communication) link 337. In this case, the health information of the native service 320 is instrumented by attributing the managed code wrapper 336 facilitating communication of the health information to the client 306.

It is to be appreciated that there can be the classic provider 322 where attribution cannot be obtained in accordance with the present invention. Here, the type of data that already describes the health of that provider 322 or of one or more internal processes P1, P2, and P3, is available to the host client DLL 310 via an adapter 338. The adapter 338 facilitates communication to the management provider 322 via a COM (Common Object Model) link 340. The health information of the classic provider 322 is provided via a file formatting process 342 (e.g., managed object format (MOF)) that is converted into an instrumentation manifest according to a convert process 344. Thus, there is no need to attribute the code and develop a manifest in accordance with the present invention. Extensions of the MOF definitions can be added to allow customization of the MOF to conversion of the instrumentation manifest.

A running application table 346 is provided with a table of ports that map to applications of the host system 302, such that a consumer of health information can access the table 346 and further access the desired application(s). When an application starts, registration is performed via dedicated registration API(s) implemented in a DLL 348, and from any part of the application 318. It registers with the table 346 such that by accessing the table 346, at any given time, it is known what instrumented applications are running on the system.

The application 318 also includes an internal state component 350 that is whatever health information that the application has to provide, e.g., statistics about successes or failures. The internal state data 350 is the data used to generated the instrumentation manifest 324 via the generation process 326. Note that attribution can also include operations that are to be performed and runtime states that can be configured, in addition to the health data.

The managed wrapper 336 used for the native service 320 can be managed code classes used to make WIN32 calls 334 in its implementation.

The following class exposes a registry key as an in-process provider:

```
namespace MyNamespace
{
    [Folder(Uri="#System/RegKey")]
    public class RegKey
    {
        [Probe(Uri="/name=_")]
        public static String GetKey(String name)
        {
            return (String)
Registry.CurrentUser.OpenSubKey("MyApp").GetValue ( name ) ;
        }
    }
}
``` which exposes one URI: #System/RegKey/name=_

Instrumentation

Instrumentation is a technique whereby an administrator can surface or expose information that might be useful for tools trying to manage an application. When the application has been instrumented, objects and events can be discovered, monitored, and configured from diverse data sources. The source of the information might be a piece of hardware, operating system, or software application. The information provided by the data source is known as instrumentation. The purpose of instrumentation is very similar to the purpose served by the instrument panel of a car dashboard. Car instrumentation includes gauges, lights and indicators that allow for monitoring information about various components (such as the fuel gauge) when various events occur (such as the open door alarm). All this instrumentation allows decisions to be made on how the car is driven and maintained. Computer components that provided instrumentation allow management software to diagnose and correct problems in an enterprise computing environment.

Other instrumentation technologies exist, such as tracing or log files, restrict applications to providing a raw block of unstructured diagnostic information (such as a simple string). To facilitate exposing application or service information, a set of classes are used that describe the information that they will provide through instrumentation. These class definitions are published, and are accessible to management tools. The class definitions are available at any time after the application is installed, and not just when the application is running. At run time, the application provides the actual data described by the classes. The concept of class definitions is at the heart of programming in managed code.

Application information for management is mostly exposed by making declarations—no extensive extra coding is required. The developer marks the objects as manageable by using the attribution capabilities and defines how the objects map into the management schema.

Using URIs and Attribution to Develop Instrumentation

Attribution of types allow for a very convenient way of adding additional semantics to that particular type. Following is a disclosed attribution scheme.

Folder Attribute: The developer uses the Folder attribute to specify that the type is instrumented. This attribute is required on all types that are instrumented. Types that can be instrumented are Classes and Structures (i.e. value types)

Folder Attribute and Default URIs: The default URI for a Probe type is defined by using namespace hierarchy where the type is defined. If an explicit URI has been set via the Folder attribute, it must be a full URI, since can override the namespace hierarchy.

Folder Attribute and Custom URIs: It is possible to override the default URI naming mechanism by setting the URI property in the Folder attribute declaration. It is possible to specify an empty string as the folder URI, in which case the member URI(s) are moved up one level. Following is a process probe with no folder URI specified.

```
namespace System.Diagnostics
{
    [Folder(Uri="")]
    public class Process
    {
        [Probe(Uri="ProcessId=_")]
        public Process ( int pid ) { }
        [Probe(Uri="ProcessId",
NavigationTypes.EndPoint)]
            public int Id { get { ; } }
        [Probe(Uri="ProcessName",
NavigationTypes.EndPoint)]
            public string Name { get { ; } }
    }
}
```

Folder Attribute and Member Separators: By default, URI fragments are separated by the '/' to form the complete URI:

```
#System/OS/Windows/Process/ProcessId=0
```

The standard separator can be overridden at the type level by setting the Separator property in the Folder attribute declaration.

Probe Attribute: The developer uses the Probe attribute to indicate that a member of a type (decorated with the Folder attribute) is a Probe.

Probe Attribute and Default URIs: By default, the parameter-less version of the attribute uses a member name to which the attribute is defined as the URI fragment. Following is a sample defaulted type locator URI for the process class.

```
namespace System.Diagnostics
{
    [Folder]
    public class Process
    {
        [Probe]
        public Process ( int pid ) { }
    }
}
```

The URI(s) for the Probe type is:

```
System/Diagnostics/Process/pid=_
```

The following table shows which members are valid instrumentation members, as well as the default naming for each.

| Member Type | Default Uri |
| --- | --- |
| Field | <FieldName> |
| Property | Get method: <PropertyName>, Set method: <PropertyName>=_ |
| Method | <MethodName>(<parameterName>=_, <parameterName>=_,...) |
| *Constructor | <parameterName>=_, <parameterName>= ,... |

*Note that even though a constructor is a method, the default URI generation is special cased to provide more logical URI(s).

A more complete example of how to default URI(s) on a Probe type is the following:

```
namespace System.Diagnostics
{
    [Folder]
    public class Process
    {
        [Probe]
        public Process ( int pid ) { }
        [Probe]
        public int Id { get { ; } }
    }
}
```

In this case, the following URI(s) are automatically generated:

```
System/Diagnostics/Process/pid=_
#System/Diagnostics/Process/pid=_/Id
```

Probe Attribute and Custom URIs: It is possible to override the default URI naming mechanism by using an overloaded form of the Probe attribute that takes a string that specifies the URI. Note that the URI(s) specified at the member level are relative to the URI at the type level.

Probe Attribute and Types/Navigation: The Probe attribute provides two properties that allow the developer to specify how that URI fragment should be interpreted. The NavigationTypes enumeration provides EndPoint and Navigational options.

Depending on the characteristics of the member that is decorated the developer can either rely on the default setting or choose from one of the above. The default settings depend on the return type of member that the attribute is applied to:

| Return Type | Default Setting |
|---|---|
| Primitive | EndPoint |
| Complex | Navigation/EndPoint |

Types are considered primitive, if they fall into one of the following: a definition of primitive type, and a string reference. Complex types are non-primitive types. A more precise definition of the modes is given below.

If the URI results in the return of another class and this class in turn is instrumented, the mode of this URI fragment is navigational. The member merely facilitates moving from one level in the class hierarchy to another. A more complex version of the process class with navigational characteristics is provided below.

```
namespace System.Diagnostics
{
    [Folder(Uri="#System/OS/Windows/Process")]
    public class Process
    {
        [Probe(Uri="ProcessId=_")]
        public Process ( int pid ) { }
        [Probe(Uri="Threads")]
        public Thread[] Threads { get { return threads; } }
    }
    [Folder]
```

```
    public class Thread
    {
        internal Thread ( ) { }
        [Probe (Uri="ThreadId",
            NavigationType=NavigationTypes.EndPoint )]
        public int Id { get { return id; } }
    }
}
```

The version above has been extended to include a property that returns all threads within a process, each thread being represented by the Thread class. Simply by attributing the Threads property with the Probe attribute, this property becomes a navigational aid from the Process class to the Thread class. Note that a navigation type is not specified, since the default is Navigation. Examining the following URI makes it clear how the Navigational feature works:

```
#System/OS/Windows/Process/ProcessId=0/Threads/ThreadId=12
```

The type locator URI is #System/OS/Windows/Process and allows the infrastructure to locate the type associated with this URI. The /ProcessId=0 is mapped to constructor of the Process class (by matching it with ProcessId=_). 0 is passed into the constructor which acts as a navigational method (navigating to an instance of the process class). The /Threads is mapped to the public Threads Property whose getter is invoked and returns a collection of Thread instances. The /ThreadId is mapped to the public Id property of the Thread class and its getter is invoked for each instance in the collection Note that in the Thread class itself that the constructor is not marked with the Folder attribute. The reason is that the Thread constructor is marked internal and is only creatable by the Process class. By not exposing construction methods it can be avoided to define URI(s) to a type that is not directly accessible.

An endpoint indicates a member that simply returns a non-Probe result, thereby indicating the end of the URI. In previous examples these are, for example, ProcessId and ThreadId properties.

In addition to the NavigationTypes enumeration, one more enumeration exists that allows the developer to specify how the URI fragment should be interpreted. The ProbeTypes enumeration defines the following members: Get, Set, and Method.

Depending on the characteristics of the member that is decorated the developer can either rely on the default setting or choose from one of the above. The default settings depend on the member to which the attribute is applied

| MemberInfo | Default Value |
|---|---|
| Method | Method |
| Property | Get or Set or both |
| Field | Get| Set |

ProbeTypes.Method: Indicates a method execution that has side affects (such as a Kill method on the Process class). ProbeTypes. Get: Indicates retrieval of value(s). By default fields and properties are getters. ProbeTypes.Set: Indicates setting of value(s). By default fields and properties are setters.

Probe Attribute and Results: An even more complicated scenario arises when the navigational member returns a more generic form of objects (such as the object type). This can occur if the member is implemented based on a generic interface definition. As an illustration of this, the Process class may have been implemented as below, where Process class implements a navigational member which returns a generic object collection.

```
namespace System.Diagnostics
{
    public interface ISomeInterface
    {
        object[ ] SomeMethod { get ; }
    }
    [Folder(Uri="#System/OS/Windows/Process")]
    public class Process : ISomeInterface
    {
        [Probe(Uri="ProcessId=_")]
        public Process ( int pid ) { }
        [Probe(Uri="Threads",NavigationType=NavigationTypes.Navigational,
    ResultType=typeof(Thread)]
        public object[ ] SomeMethod { get { return (object[ ])
    threads; } }
    }
    public class Thread
    {
        internal Thread ( ) { }
        [Probe (Uri="TreadId",
    NavigationType=NavigationTypes.EndPoint )]
        public int Id { get { return id; } }
    }
}
```

In situations like this, some more information is required in order to successfully navigate to the Thread class. More specifically, the developer will have to set the ResultType property in the Instrumentation attribute declaration which allows them to specify the type of objects that are contained in the collection or array.

It should be noted that Probe members can return primitive, as well as complex types. The schema of a return type for a Probe member will be stored in the manifest.

Note that the schema for a return type includes all public members unless the public member is attributed with the Probe attribute and is a complex type in which case a link to the URI is returned instead. If a developer chooses to ignore members, they can do so via the XMLIgnore attribute.

The ability to reach classes via URI(s) provides a uniform way of accessing code, as well as an implementation independent URI structure. In order to provide the capability of retrieving objects based on URI syntax, the infrastructure has to know, in detail, the construction semantics/syntax of that Probe type. Instrumentation supports custom object creation (i.e., via a separate dedicated method) and also supports three of the main construction mechanisms.

There are essentially two main programming paradigms for object construction: construction via constructor; and construction via static methods. The code illustration behind this discussion will be a slimmed down version of the process class altered slightly to illustrate each of the programming models. Following is a sample of process class using a constructor with one parameter as the object creation mechanism.

```
namespace System.Diagnostics
{
    [Folder (Uri="#System/OS/Windows/Process")]
    public class Process
    {
```

-continued

```
        [Probe (Uri="ProcessId=_")]
        public Process ( int pid ) { }
    [Probe(Uri="ProcessId",NavigationType=NavigationTypes.EndPo
int)]
        public int Id { get { ; } }
    [Probe(Uri="ProcessName",NavigationType=NavigationTypes.End
Point)]
        public string Name { get { ; } }
    }
}
```

The following sample URI to this object constructs a process object that represents the OS process with process id=0.

```
#System/OS/Windows/Process/ProcessId=0
```

Another sample URI to this object constructs a process object that represents the OS process with process id=12 and then returns the ProcessName property.

```
#System/OS/Windows/Process/ProcessId=0/ProcessName
```

Following is an example of a slightly modified process class where the constructor takes two parameters.

```
namespace System.Diagnostics
{
    [Folder (Uri="#System/OS/Windows/Process")]
    public class Process
    {
        [Probe (Uri="ProcessId=_,ProcessName=_")]
        public Process (int pid,
            string pName )
        {
        }
        [Probe (Uri="ProcessId",
    NavigationType=NavigationTypes.EndPoint)]
        public int Id { get { ; } }
        [Probe (Uri="ProcessName",
    NavigationType=NavigationTypes.EndPoint)]
        public string Name { get { ; } }
    }
}
```

If a method takes multiple parameters, they must be specified in the correct order (i.e., they are regarded as positional parameters). From the code above, a URI that constructs a process object that represents the OS process with process id=12 and name svchost would look like following:

```
#System/OS/Windows/Process/ProcessId=12,ProcessName=svchost
```

A URI that constructs a process object that represents the OS process with process id=12 and name svchost and then returns the ProcessId property would look like following:

```
#System/OS/Windows/Process/ProcessId=12,ProcessName=svchost
/ProcessId
```

A URI that constructs a process object that represents the OS process with process id=12 and name svchost and then returns the ProcessName property would look like following:

```
#System/OS/Windows/Process/ProcessId=0,ProcessName=svchost/ProcessName
```

Note that if the defaulted Probe attribute is used with a method that takes multiple parameters, the auto-generated URI would look like:

```
#System/Diagnostics/Process/pid=__,pName=__
```

There may be cases where there are a fairly large number of constructors. As an illustration of this scenario, consider the Process class and redesign it to have one required identifier (Id) and three non-identifiers (username, password, machine which all default to current user and local machine). The code may look following:

```
namespace System.Diagnostics
{
    [Folder (Uri="#System/OS/Windows/Process")]
    public class Process
    {
        [Probe (Uri="ProcessId=__")]
        public Process ( int pid )
        {
        }
        [Probe
(Uri="ProcessId=__,UserName=__, Password=__,Machine=__")]
        public Process ( int pid,
            string user,
            string password,
            string machine)
        {
        }
        [Probe (Uri="ProcessId=__,Machine=__")]
        public Process ( int pid,
            string machine)
        {
        }
        [Probe (Uri="UserName",
NavigationType=NavigationTypes.EndPoint)]
        public string UserName { get { ; } }
        [Probe (Uri="Machine",
NavigationType=NavigationTypes.EndPoint)]
        public string MachineName { get { ; } }
        [Probe (Uri="ProcessId",
NavigationType=NavigationTypes.EndPoint)]
        public int Id { get { ; } }
    }
}
```

The first constructor uses the process id as the parameter and assumes current user and local machine. The second constructor requires: process id, user name, password and machine name to be specified. The third constructor assumes current user and allows you to specify a machine name and pid.

In cases where there are a number of overloaded constructors, all relevant constructor parameters need to be attributed. Each constructor that should be used is attributed with the Probe attribute. The following sample URI constructs a process object that represents the OS process with process id=12 using the first constructor.

```
#System/OS/Windows/Process/ProcessId=12
```

The following sample URI constructs a process object that represents the OS process with process id=12 on machine marioh-dev using the third constructor.

```
#System/OS/Windows/Process/ProcessId=12,Machine=marioh-dev
```

The following sample URI constructs a process object that represents the OS process with process id=12 on machine marioh-dev with user marioh and password (password). This will use the second constructor.

```
#System/OS/Windows/Process/ProcessId=12,UserName=ntdev\marioh,Password=xyz,Machine=marioh-dev
```

Following is a sample of process class using a static method as means of construction.

```
namespace System.Diagnostics
{
    [Folder(Uri="#System/OS/Windows/Process")]
    public class Process
    {
        private Process ( ) { }
        [Probe(Uri="ProcessId=__")]
        public static Process GetById ( int pid ) ;
        [Probe(Uri="ProcessId"),
NavigationType=NavigationTypes.EndPoint]
        public int Id { get { ; } }
        [Probe(Uri="ProcessName" ,
NavigationType=NavigationTypes.EndPoint)]
        public string Name { get { ; } }
    }
}
```

The above code illustrates another common programming model, whereby the construction of the object is handled by a static method (i.e., GetById in example above). In this case, the static method itself is marked with the Probe attribute. The following sample URI constructs a process object that represents the OS process with process id=12.

```
#System/OS/Windows/Process/ProcessId=12
```

The following sample URI constructs a process object that represents the OS process with process id=12 and then accesses the ProcessId property.

```
#System/OS/Windows/Process/ProcessId=12/ProcessId
```

The following sample URI constructs a process object that represents the OS process with process id=12 and then accesses the ProcessName property.

```
#System/OS/Windows/Process/ProcessId=12/ProcessName
```

To summarize object construction, if object construction is via a constructor, the following rules apply: the constructor is marked with the Probe attribute; if the constructor takes two or more parameters, they are always positional; parameter types are limited to primitive types; multiple constructors can be decorated with the Probe attribute; Probe constructors cannot use the ResultType property of the Probe attribute; mode property is set to the default NavigationTypes.Navigational; specify DocName and DocPath properties of the Probe attribute for documentation purposes; constructor parameters is in-only; and the constructor is public.

If object construction is via a static method, the following rules apply: the static method is marked with the Probe attribute; if the static method takes two or more parameters, they are always positional; parameter types are limited to primitive types; multiple static construction methods can be decorated with the Probe attribute; the ResultType property of the Probe attribute can be used to indicate a different return type; method parameters can be in-only; method is public; mode property is set the default, which is NavigationTypes.Navigational; and specify DocName and DocPath properties of the Probe attribute for documentation purposes.

While enumerating data from a particular type is as simple as attaching an Probe attribute to the enumeration method, sometimes it is very convenient to be able to quickly find the URI that corresponds to the enumeration. Imagine looking through 200 URIs for a particular type just to find the method that enumerates objects of this type. The operation is common enough to warrant the introduction of an Enumerator attribute that specifies clearly which URI corresponds to the enumeration.

There are essentially two models for enumerations in classes. One form of enumeration falls into the scope of the Enumerator attribute, where enumeration of all instances of the class (such as all running processes) take the form of static methods in the class. Another form, is enumeration of a subset of data contained within the class (such as Threads within a Process class). These types of enumerations typically take the form of methods or properties of an instance of the class. This form of enumeration may fall into the scope of the Enumerator attribute depending on the overall design of the class.

The following code shows decoration of a process class with static GetProcesses method returning a collection of running processes.

```
namespace System.Diagnostics
{
    [Folder(Uri="#System/OS/Windows/Process")]
    public class Process
    {
        [Probe(Uri="ProcessId=_")]
        public Process ( int pid ) { }
        [Probe(Uri="ProcessId",
InstrumentationMode.EndPoint)]
        public int Id { get { ; } }
        [Probe(Uri="*")]
        [Enumerator]
        public static Process[ ] GetProcesses ( ) { }
    }
}
```

The static GetProcesses method returns a collection of all currently running processes. By simply decorating the method with the Probe attribute (and associated URI), as well as the Enumerator attribute, it can be ensured that this method is invoked properly when referenced in a URI. The following sample URI returns a collection of all running processes.

```
#System/OS/Windows/Process/*
```

The following sample URI returns a collection of all running processes and gets the process object that represents the OS process with process id=12.

```
#System/OS/Windows/Process/*/ProcessId=12
```

If the static method or property that the Enumerator attribute is applied to does not specify a type (using an overload of the attribute) it is assumed that the returned collection contains instances of the parent type. In the above sample code, it is assumed that the collection returns instances of the Process class (although it may appear obvious, in certain cases, the returned collection may contain instances of 'object' such as in interface implementations.

Most of the time, standard collections will be used and post-filtering is required to get specific instances. In cases where the returned collection is a specialized collection containing an Identifier, e.g., for the instances in the collection, instance can be more effectively reached. Using the same example as above, the Threads property of the process class may return a ThreadCollection that contains an indexer that serves as the Identifier. Following is an example where the returned ThreadCollection implements a fast retrieval mechanism via the indexer.

```
namespace System.Diagnostics
{
    [Folder(Uri="#System/OS/Windows/Process")]
    public class Process
    {
        [Probe(Uri="ProcessId=_")]
        public Process ( int pid ) { }
        [Probe(Uri="ProcessId",
InstrumentationMode.EndPoint)]
        public int Id { get { ; } }
        [Probe(Uri="Threads",
NavigationTypes.Navigational, typeof(Thread))]
        public ThreadCollection Threads { get { } }
    }
    public class Thread
    {
        internal Thread ( ) { }
        [Probe(Uri="CPUTime",
InstrumentationMode.EndPoint)]
        public int CPUTime { get { } }
    }
    public class ThreadCollection : ICollection
    {
        //
        // Standard ICollection implementation
        //
        ...
        ...
        [Probe (Uri="ThreadId=_")]
        public Thread this[int tId] { get { } }
    }
}
```

If the returned collection implements a member for efficient retrieval it can be marked with the Probe attribute. The member is not limited to an indexer.

If the return type is a strongly typed array or collection that is not instrumented, a mechanism exists to do post filtering. In order for this to work, the type that is contained in the array/collection is instrumented and contains a member (property or field) that is marked with the Key attribute. If the contained type does not contain any members with the Key attribute, URI generation will stop at this point, since there is no way to figure out where to post filter. Below is an example of this scenario whereby the Process class returns a Thread array, the returned ThreadCollection implements a fast retrieval mechanism via the indexer.

```
namespace System.Diagnostics
{
    [Folder(Uri="#System/OS/Windows/Process")]
    public class Process
    {
        [Probe(Uri="ProcessId=_")]
        public Process ( int pid ) { }
        [Probe(Uri="ProcessId")]
        public int Id { get { ; } }
        [Probe(Uri="Threads",ResultType=typeof(Thread))]
        public Thread [ ] Threads { get { } }
    }
    public class Thread
    {
        internal Thread ( ) { }
        [Probe]
        [Key]
        public int Id { get { } }
        [Probe(Uri="CPUTime")]
        public int CPUTime { get { } }
    }
}
```

An examples of a valid URI for the above is the following:

```
#System/Os/Windows/Process/ProcessId=_/Threads/Id=_
```

Note that while the static portion of the URI is case insensitive, the variable portion may not be and it is up to the instrumentation developer to choose how to handle the case sensitivity issue for their particular provider.

In summary, if a member exists that represents an enumeration of the data space, the following rules apply: the member is be decorated with the Probe attribute; the member specifies a return type (using ResultType property) unless the return type is a strongly typed array; the returned type implements IEnumerable or an array; if the returned collection contains a member that can retrieve a particular instance efficiently, it is marked with the Probe attribute; the member can be decorated with the Enumerator attribute to clearly indicate its intentions; any member parameters are primitive types; any member parameters are in-only; the member can be (1) Method (2) Property (3) Field; and specify DocName and DocPath properties of the Probe attribute for documentation purposes.

Typically, classes support methods that correspond to a limited form of queries. The Process class in System.Diagnostics exposes a method called GetProcessesByName which is equivalent to SELECT*FROM PROCESS WHERE NAME=<value>. This form of "stored procedure" can be marked with the Probe attribute with an associated URI, as illustrated in the following code.

```
namespace System.Diagnostics
{
    [Folder(Uri="#System/OS/Windows/Process")]
    public class Process
    {
        [Probe(Uri="ProcessId=_")]
        public Process ( int pid ) { }
        [Probe(Uri="ProcessId",
NavigationType=NavigationTypes.EndPoint)]
        public int Id { get { ; } }
        [Probe(Uri="ProcessName",
NavigationType=NavigationTypes.EndPoint)]
        public string Name { get { ; } }
        [Probe(Uri="ProcessName=_")]
        public static Process [ ] GetProcessesByName
( string processName ){ }
    }
}
```

The following URI returns all process objects that represents the OS processes with process name=SVCHOST.

```
#System/OS/Windows/Process/ProcessName=SVCHOST]
```

If a class is willing to handle queries in its entirety, the method handling the query can be attributed with the Probe attribute and take one variable as part of the URI fragment, representing the query, as in the following example code, where Process class implements a query method.

```
namespace System.Diagnostics
{
    [Folder(Uri="#System/OS/Windows/Process")]
    public class Process
    {
        [Probe(Uri="ProcessId=_")]
        public Process ( int pid ) { }
        [Probe(Uri="ProcessId",
NavigationType=NavigationTypes.EndPoint)]
        public int Id { get { ; } }
        [Probe(Uri="ProcessName",
NavigationType=NavigationTypes.EndPoint)]
        public string Name { get { ; } }
        [Probe(Uri="ProcessName=_")]
        public static Process [ ] GetProcessesByName
( string processName ){ }
        [Probe(Uri="GetByQuery=_")]
        [Query("WQL")]
        public static Process [ ] GetByQuery ( string
query ){ }
    }
}
```

A sample URI follows that returns a collection of process instances that satisfy the query. Note that the query method takes a string as input parameter.

```
#System/OS/Windows/Process/GetByQuery=SELECT *
    FROM PROCESS
WHERE NAME=SVCHST
```

In summary, methods corresponding to queries are attributed with the Probe attribute. If a class wants to support queries in full, it attributes the method with the Probe attribute, the method signature takes a string parameter representing the query, the type is sufficiently described (including what query language), the method is attributed with the Query attribute specifying the query language it supports, and query methods can be static as well as non-static.

All methods exposed as Probe are marked as such with the ProbeTypes.Method. The definition of a method execution is that is has side-effects. An example of this would be the Kill method on the Process class. Methods are marked so that administrators have a clear understanding that execution of these methods result in a state change. Consider a slightly altered Process class that implements a kill process.

```
namespace System.Diagnostics
{
    [Folder(Uri="#System/OS/Windows/Process")]
    public class Process
    {
        [Probe(Uri="ProcessId=_")]
        public Process ( int pid ) { }
        [Probe(Uri="ProcessId")]
        public int Id { get { ; } }
        [Probe(Uri="ProcessName")]
        public string Name { get { ; } }
        [Probe(Uri="Kill",
ProbeType=ProbeTypes.Method)]
        public void Kill ( ) { }
    }
}
```

Here, the ProbeTypes.Method is used to indicate that this is indeed a method with side-effects, as well as InstrumentationMode.EndPoint. Following is a sample URI that kills a process with id 0 (idle process):

```
#System/OS/Windows/Process/ProcessId=0/Kill
```

Note that methods with side-effects can be static as well as non-static.

In summary, a method is considered an Operation if the method has side-effects, a method is decorated with the Probe attribute; parameters passed to the method are primitive types and in parameters, methods can be static and non-static, a method can be public, DocName and DocPath are specified properties of the Probe attribute for documentation purposes, and if the method takes two or more parameters they are always positional.

Probe types provide documentation for each URI. Documentation falls into the following categories: a short one sentence description for each URI; a browser compatible help-link that provides extended documentation; parameterized URI(s) require documentation for each parameter so that users know how to form it, as well as at least one fully worked out example, optionally, each parameterized documentation section can provide additional help; and, a set of tags that act as standardized keyword searches inside the windows instrumentation catalog In order to avoid cluttering the code with all the required documentation, a DocName property can be set in the declaration of the Probe attribute together with the DocPath property (XPATH based) to reference specific portions of an XML document. A fully documented version of the Process class can be seen below.

```
[Folder(Uri="#System/OS/Windows/Process")]
    public class Process
    {
        [Probe(Uri="ProcessId=_",
DocName="docs/process.xml",
DocPath="//Process/ProcessConstructor")]
        public Process ( int pid ) { }
        [Probe(Uri="ProcessId",
NavigationType=NavigationTypes.EndPoint,
DocName="docs/process.xml", DocPath="//Process/ProcessId")]
        public int Id { get { ; } }
    }
```

The associated XML document is as follows.

```
<Process>
    <ProcessConstructor>
        <Description lang="en"> Returns a process with the
specified process ID </Description>
        <Description lang="se"> Aterlamnar en process med
                den
specifierade process identifikationen
</Description>
        <UriHelp>
            <_1 lang="en"> The process identifier
                specified as
an integer value </_1>
            <_1 lang="se"> Process identifikations nummer
specificerad som ett integer nummer </_1>
            <Example>
                #System/OS/Windows/Process/ProcessId=0
</Example>
        </UriHelp>
        <HelpLink xmlns:xlink="http://www.w3.org/xlink"
xlink:href="http://www.TheFinalProcessClass.com/Process.html"/>
        <Tags>
            <Tag name="Process"/>
            <Tag name="Application"/>
            <Tag name="Service"/>
        </Tags>
    </ProcessConstructor>
    <ProcessId>
        <Description lang="en"> Returns the process ID
associated with the process </Description>
        <Description lang="se"> Aterlamnar process
identifikationen associerad med en process </Description>
        <UriHelp>
            <_1 lang="en"> The process identifier
                specified as
an integer value </_1>
            <_1 lang="se"> Process identifikations nummer
specificerad som ett integer nummer </_1>
            <Example>
#System/OS/Windows/Process/ProcessId=0/ProcessId </Example>
        </UriHelp>
        <HelpLink xmlns:xlink="http://www.w3.org/xlink"
xlink:href="http://www.TheFinalProcessClass.com/Process.html"/>
        <Tags>
            <Tag name="Process"/>
            <Tag name="Application"/>
            <Tag name="Service"/>
        </Tags>
    </ProcessId>
</Process>
```

Note that each Probe member specifies a DocName and DocPath which contains all the required documentation as stated above.

In cases where multiple member URI fragments are ambiguous, it becomes necessary to escape parameters in order to disambiguate. This situation typically arises when overloaded methods share portions of their URI fragments, indicated in the following code.

```
namespace System.Diagnostics
{
    [Folder (Uri="#System/OS/Windows/Process")]
    public class Process
    {
        [Probe (Uri="ProcessId=_")]
        public Process ( int pid )
        {
        }
        [Probe
(Uri="ProcessId=_,UserName=_, Password=_,Machine=_")]
        public Process ( int pid,
            string user,
            string password,
            string machine)
        {
        }
        [Probe (Uri="UserName")]
        public string UserName { get { ; } }
        [Probe (Uri="Machine")]
        public string MachineName { get { ; } }
        [Probe (Uri="ProcessId")]
        public int Id { get { ; } }
    }
}
```

Consider that the following URI is be specified.

```
#System/OS/Windows/Process/ProcessId=12,UserName=marioh,Password=xyz,Machine=marioh-dev
```

Since both the first and second constructor match this URI, the URI input will have to escape the parameters:

```
#System/OS/Windows/Process/ProcessId="12",UserName="marioh",Password="xyz",Machine="marioh-dev"
```

In addition, parameters which are arrays of primitive type use the comma character ',' as the element separator in the URI.

```
namespace System.Diagnostics
{
    [Folder (Uri="#System/OS/Windows/Process")]
    public class Process
    {
        [Probe]
        public static GetProcesses ( int[ ] pids )
    }
}
```

Following is sample URI where the portion as numbers 0, 1, 2, 3 get passed as the array parameter (pids).

```
#System/OS/Windows/Process/GetProcesses(pids="0,1,2,3")
```

Array parameters that can accept a null value are used as in the following.

```
#System/OS/Windows/Process/GetProcesses(pids="")
```

Error reporting can be done using an exception mechanism. From an instrumentation developers point of view, there are essentially two categories of exceptions that can be thrown from Probe code: underlying component exceptions, where this includes exceptions such as ThreadAbortedException, as well as any exceptions not directly thrown by the instrumentation code; and instrumentation code specific exceptions.

Application Management

A goal is to make application management identical (or as close as possible) to the client loadable development process. Following are additional API(s)/steps required to fully instrument an application or service. The following small sample application consisting of two classes will be used to illustrate these APIs/steps.

```
using System;
using Microsoft.Management.Instrumentation;
namespace AppManagement
{
    public class MyApp
    {
        private static RequestQueue queue ;
        public static RequestQueue GetQueue ( )
        {
            return queue ;
        }
        static void Main(string[ ] args)
        {
            queue = new RequestQueue ( ) ;
            Console.WriteLine ( "Hit <enter> to register app" ) ;
            Console.ReadLine ( ) ;
            Console.WriteLine ( "Hit <enter> to quit app" ) ;
            Console.ReadLine ( ) ;
        }
    }
    public class RequestQueue
    {
        private static int maxNumberOfRequests = 10;
        public int MaxNumberOfRequests
        {
            get { return maxNumberOfRequests; }
        }
    }
}
```

The sample application has a main class that contains an instance of a request queue. In the sections below, we will show how to expose the maximum number of requests from a running instance of this application.

The very first thing an application must do to be instrumented is to register itself and include the associated application instance id. The instance id can be any string that is unique across all instances of the application. If an instance id is not specified, the process id is used. The URI(s) for instrumented applications look the same as in-process instrumented assemblies with the exception of an 'appinstance' fragment of the URI:

```
#System/Applications/MyApp[id="xyz"]/probeUri
```

Note that the application instance fragment can be changed by the developer.

Two API(s) can be used for registration:

| API | Description |
| --- | --- |
| bool Register ( ) | Registers an application instance with the default instance id being the process id. |
| bool Register (string id) | Registers an application instance with the specified instance id. |

To include registration code, the sample application can be modified slightly in the main method.

```
[assembly:ApplicationProbe("#System/Applications/MyApp")]
    static void Main(string[ ] args)
    {
        queue = new RequestQueue ( ) ;
        Console.WriteLine ( "Hit <enter> to register app" ) ;
        Console.ReadLine ( ) ;
        System.Management.Instrumentation.Application.Register ( ) ;
        Console.WriteLine ( "Hit <enter> to quit app" ) ;
        Console.ReadLine ( ) ;
    }
```

The modified sample contains a call to the first version of the Register API that relies on the default application instance id to be the process id. Behind the scenes, the Register API sets up the IPC endpoint so that future client requests are routed to the correct instance. When the application exits or the application domain from which the Register call was made is unloaded, the infrastructure handles deregistration automatically. If an application enters a suspended state and wants to un-register manually, the Suspend/Resume API(s) are available.

| API | Description |
| --- | --- |
| bool Suspend ( ) | Suspends the publishing of instrumentation data from application |
| bool Resume ( ) | Resumes the publishing of instrumentation data from application |

An application may also unregister itself explicitly by using the Unregister method.

| API | Description |
| --- | --- |
| bool Unregister ( ) | Unregisters the application. |

In addition, an assembly level attribute called ApplicationProbe needs to be declared to specify the URI prefix that the application supports.

When generating URI(s) to this application, the infrastructure will use this URI to identify which URI prefixes are owned by this application and append the instance id fragment.

```
#System/Applications/MyApp[id="xyz"]/probeUri
```

Alternatively, the application URI can include a variable portion to replace the default ([id=_]).

Now that the application has been registered and is identifiable, the next step is to expose the information from the application. The model used for exposing the information is no different from in-process instrumented assemblies, and includes the Decorated classes/members to expose management information.

```
[Folder]
public class MyApp
{
    private static RequestQueue queue ;
    [Probe(Uri="/RequestQueue")]
    public static RequestQueue GetQueue ( )
    {
        return queue ;
    }
    ...
    ...
    ..
}
[Folder]
public class RequestQueue
{
    private statis int maxNumberOfRequests = 10;
    [Probe]
    public int MaxNumberOfRequests
    {
        get { return maxNumberOfRequests; }
    }
}
```

Note that the Folder attribute uses the default constructor and does not specify a URI to the type since the assembly level ApplicationProbe attribute has been used to define the URI prefix for all instrumented types. The possible URI(s) for the above are:

```
#System/Applications/MyApp[id=xyz]/MyApp/RequestQueue
#System/Applications/MyApp[id=xyz]/MyApp/RequestQueue/MaxNumberOfRequests
```

In addition to the URI(s) generated for an instrumented application, the following URI is generated automatically when the application manifest is built:

```
#System/Applications/MyApp/id=*
```

This result of executing this URI is a list of all running instances of the application. Note that since all URI(s) can be case in-sensitive, it is important to avoid defining application instance ID(s) that only differ in casing.

Figure 4:
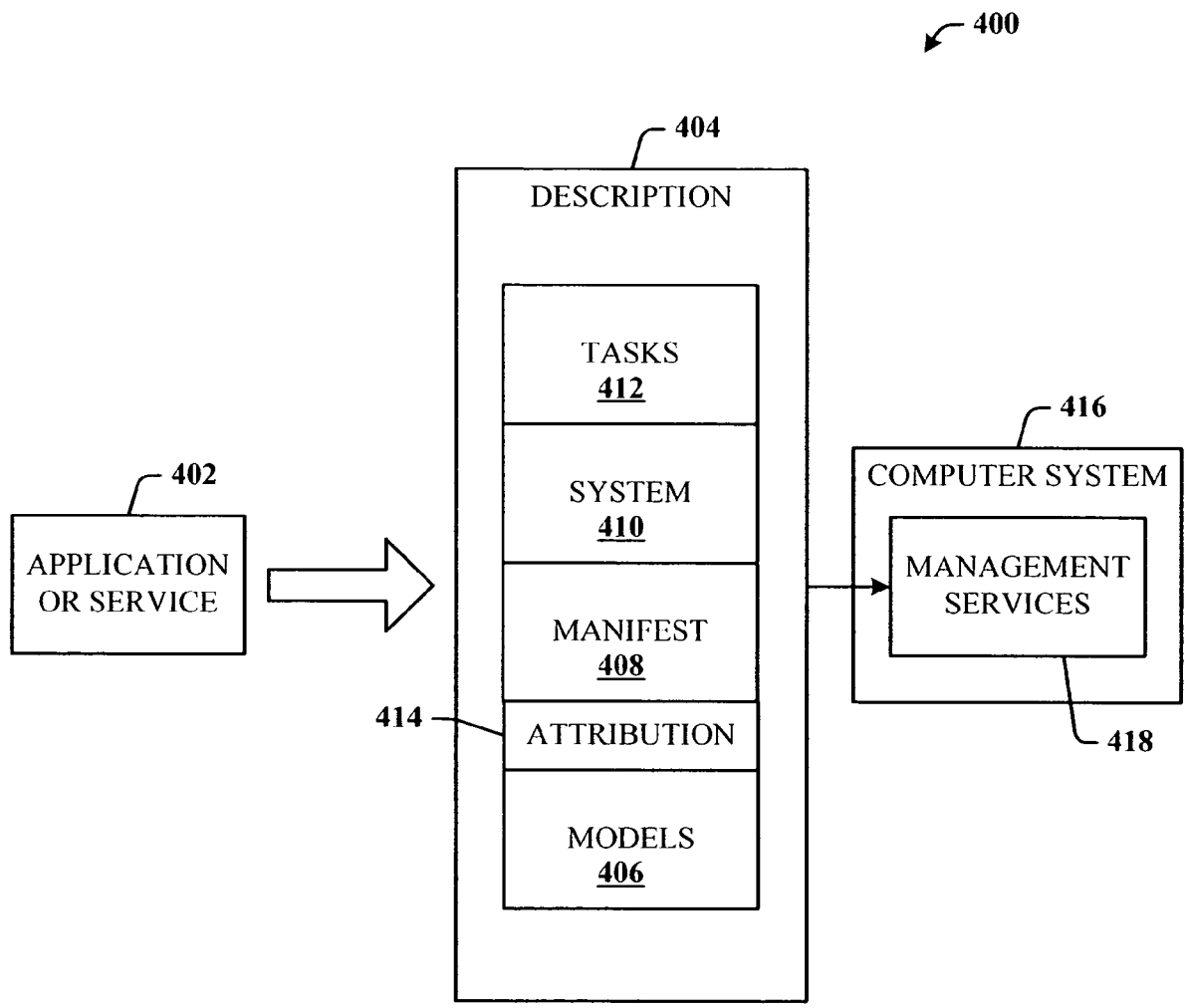
FIG. 4 illustrates a model-based management architecture that utilizes the URI architecture of the present invention.

Referring now to FIG. 4, there is illustrated a model-based management architecture 400 that utilizes the URI architecture of the present invention. The model-based management approach allows a developer to describe an application or service 402 in terms of its constituent components and desired states in terms of functionality, configuration, security, and performance. Thus, an application or service description 404 facilitates describing the application 402 in terms of one or more components, including at least a tasks component 412, a system component 410, a manifest component 408, a model component 406, and an attribution component 414. A computer system 416 uses the application description 404 at installation of the application 402 to configure management services 418 associated with the computer operating system. The management services then help ensure uptime of the application or service 402 through automatic management actions such as configuration management, problem detection, diagnosis, and recovery. The model also describes common tasks that the administrator may perform. The model-based management architecture 400 facilitates a lower total cost of ownership, and is used across the application lifecycle from development, to deployment, operations, and business analysis.

Figure 5:
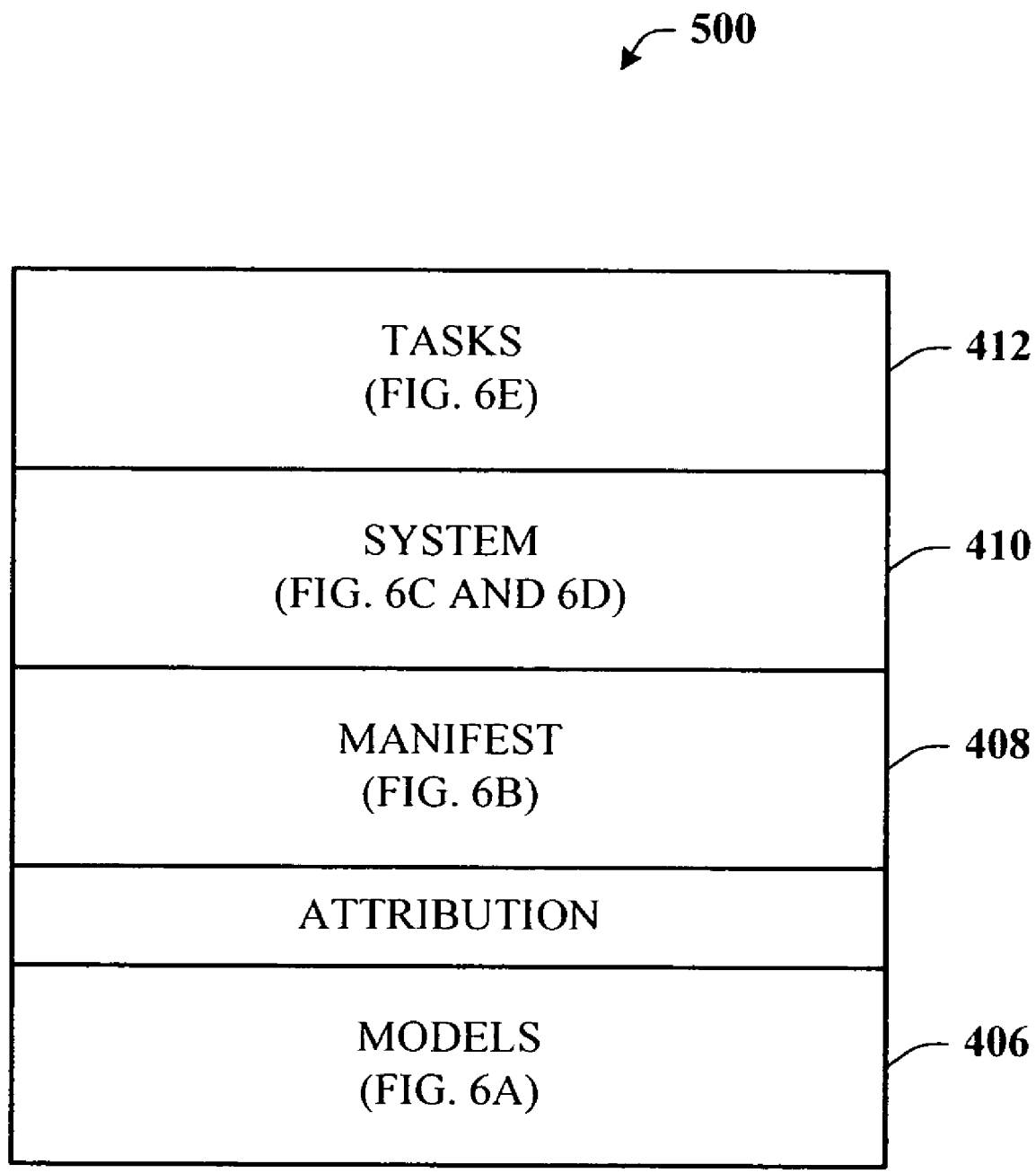
FIG. 5 illustrates a drawing map related to describing the principal components of the model-based management architecture.

Referring now to FIG. 5, there is illustrated a drawing map 500 related to describing principal components of the model-based management architecture 400. The architecture includes the models component 406 that is described in relation to FIG. 6A, the manifest component 408 that is described in relation to FIG. 6B, the system component 410 that is described in relation to FIG. 6C and FIG. 6D, and the tasks component 412 that is described in relation to FIG. 6E. Attribution has already been described, and will be addressed throughout the specification.

Figure 6B:
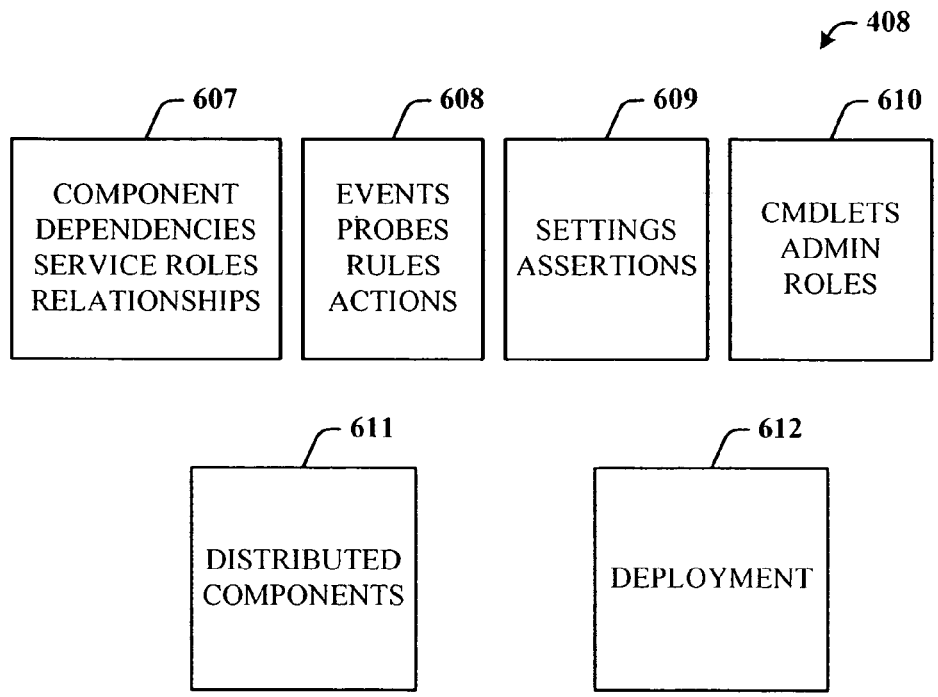
FIG. 6B illustrates blocks associated with the manifest component of the model-based management architecture.
Figure 6A:
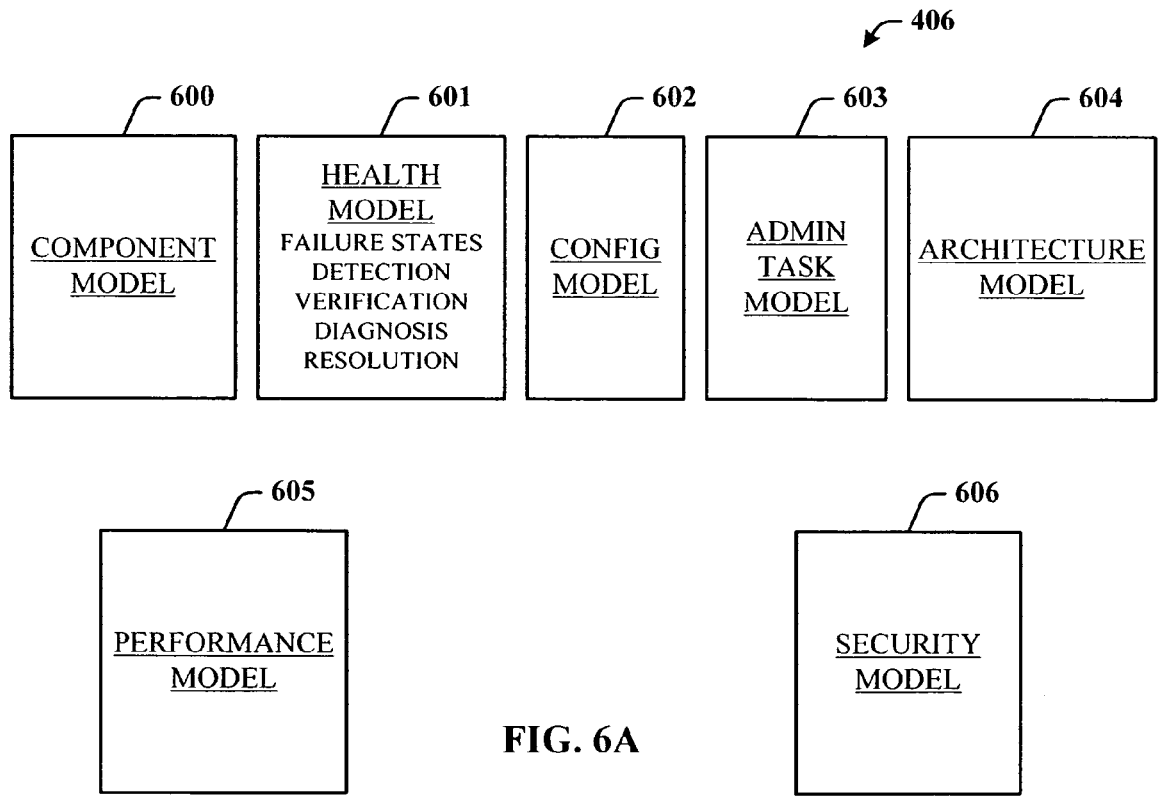
FIG. 6A illustrates blocks associated with the models component of the model-based management architecture.

Referring now to FIG. 6A, there are illustrated blocks associated with the models component 406 of the model-based management architecture. Models are developed for the components making up an application, health states and recovery, configuration settings, and administrative tasks.

In support thereof, there is a component model subcomponent 600 for modeling any and all components of the system (and relationships, dependencies and service roles associated therewith). The component model 600 describes the files, configuration, different ways the application can be installed, and more.

A health model subcomponent 601 can be developed to describe the various failure states, and the way that the application or service could fail. The health model 601 describes the steps that would need to be taken to automate the health features. The health model 601 represents at least the failure states, detection the states, verification, diagnosis, and resolution of the system states. The health states can be described in terms of what criteria must be met to be considered completely healthy, to completely fail and any intermediate states, e.g., degraded performance, partially working, some of the customer functionality is working, and is the application or service delivering the expected level of service. Health also considers that functionality could be fine, but performance is substandard indicating that the application or service is not healthy.

A configuration model subcomponent 602 is associated with modeling the system configuration. The configuration model 602 is used to describe the application settings, user controls, default values, various restrictions, etc. An administrative task model subcomponent 603 is associated with modeling administrative tasks, and includes the actions a user can take upon a system, such as start, stop, add user, add database, and corrective actions that can be called from the health model 601. The model 602 enumerates all that can be done with the application or service. An architecture model 604 is used to describe distributed environments and associated deployment, normally associated with, for example, a large network of clients having the same or similar hardware and software settings and configuration, and distributed databases. Thus, a local application may be dependent on a remote disk array. At deployment, the disk array needs to be instanced at the deployment level with a manifest and using URIs. Since the URI is machine independent, distributed systems can also obtain the benefits of the model-based management system. A performance model 605 can be developed to describe the way in which the developer wishes to use metrics for monitoring performance of the application or service. This is closely related to health of the system. A security model 606 can be generated that describes the types of security associated with the application or service.

Note that the number of models provided herein is not exhaustive, since the developer can provide many different models for managing various aspects of the application or service.

The subject model-based system can employ various artificial intelligence based schemes for carrying out various aspects thereof. For example, with respect to models, a process for determining what models can be utilized for a given instance or implementation can be facilitated via an automatic classification system and process. Moreover, such classifiers can be used to build operational profiles of the system that start to detect system patterns, and learn what is a good state, a bad state and, successful and unsuccessful transactions. This information can then be fed back into the corresponding model and used as an updated model for a follow-on system. Such classification can employ a probabilistic and/or statistical-based analysis (e.g., factoring into the analysis utilities and costs) to prognose or infer an action that a user desires to be automatically performed. For example, a support vector machine (SVM) classifier can be employed. Other classification approaches include Bayesian networks, decision trees, and probabilistic classification models providing different patterns of independence can be employed. Classification as used herein also is inclusive of statistical regression that is utilized to develop models of priority.

As will be readily appreciated from the subject specification, the model-based system can employ classifiers that are explicitly trained (e.g., via a generic training data) as well as implicitly trained (e.g., via observing user behavior, receiving extrinsic information) so that the classifier(s) is used to automatically determine according to a predetermined criteria, for example, what initial settings to use for a given implementation, and then adjusting the settings over time as the system matures and experiences various loading conditions with respect to data, number of installed applications, and the number of nodes with which to interact. For example, with respect to SVM's that are well understood, SVM's are configured via a learning or training phase within a classifier constructor and feature selection module. A classifier is a function that maps an input attribute vector, x=(x1, x2, x3, x4, xn), to a confidence that the input belongs to a class—that is, f(x)=confidence(class). In the case of management systems, for example, attributes are system parameters of desired states, and the classes are categories or areas of interest (e.g., all drives, all native process). Classifiers can also be employed to capture and analyze transaction logs, look for patterns, and diagnose a system by looking for successful and unsuccessful patterns.

Configuration health involves, for example, changing a queue size from five to ten, and determining what impact the change can have on the application, service, or system. The same applies for security and performance, where a classifier can be employed to monitor performance counters and make system changes accordingly to optimize performance. Security can also be monitored and analyzed for patterns, the impact of which can be used to suggest or alter security polices. Thus, it is to be appreciated that health is a broad concept that can be applied to many areas of the system. In a system-wide scope, performance can be good, but security could be poor. Thus, a holistic view that crosses many disciplines of the system is advantageous.

The desired states of the administrator can be expressed in the code, which is surfaced in the manifest and passed for monitoring by the monitoring service. The system can, based upon instructions in the manifest, monitor the application or service and alert the administrator when the application or service does not meet the performance, and based on the instructions, take corrective actions. For example, where a test setting for e-mail is not maintained, but falls below a threshold for a period of time, another machine can be added until the load subsides, and the network traffic can also be used as a trigger increasing the number of resources to handle the given load. A goal is to automate as much as possible so that the administrator is involved only when manual action is required.

The model-based management system is composable. It is component based, with a component comprising most anything. Thus, the system can be reduced to its lowest manageable piece and composed back up. In a database, for example, there is the application, with instances, the database, tables, and stored procedures, and can be reduced as low as a single file. Consider a 401k application. The 401k application can depend on a database, a web sever, and the customer's own business logic, down to a database that depends on the operating system and associated. It is desirable to manage and report at the various levels. Applications are described through relationships between components. These relationships can express how an individual application is assembled (e.g., SQL server contains a service, instances, and databases), platform requirements (e.g., operating system and other applications), and communication to other components (the web server connecting to the SQL server). A single administrator may care about a database and a single machine, whereas a finance administrator may care about the 401k application, and the CIO cares about all of the applications and machines. The models, reporting, and desires states should process everything such that individual metrics can be referenced to determine if the system is doing what is expected.

All models are tied into a URI namespace, providing a standard way of navigating the system, enumerating all components installed, and asking the component what it provides, what is considered healthy, what events does it have, what error events occurred in the last day or hours, what configuration settings are included, what changes occurred in the last hour, etc.

Referring now to FIG. 6B, there are illustrated blocks associated with the manifest component 408 of the model-based management architecture. The manifest that ships with the application contains information from the models and source code attribution in a machine-readable form for use by management system services. Administrative tasks for an application are defined within the manifest. There can be a number of manifests generated that correspond to the models, including the following; a first manifest subcomponent 607 associated with component dependencies, relationships between the components, and service roles; a second manifest subcomponent 608 associated with events, probes, rules, and actions; a third manifest subcomponent 609 associated with settings and assertions; a fourth manifest subcomponent 610 associated with commands (i.e., cmdlets) and administrative roles; a fifth manifest subcomponent 611 associated with distributed environments; and a sixth manifest subcomponent 612 associated with deployment.

The manifest is the "bridge" between developer and, the operations team and the administrator, and is created automatically with a tool that sweeps the models for the attributed code. The component manifest 607 is used by a setup engine to determine how to install the application or service. It describes the logical components, files, where the files should be installed, and configuration settings (or any settings). Dependencies are what need to be defined before installation, and include various roles, so that the application can be installed in different modes, with varying degrees of security, and different operational profiles. The component manifest 607 makes it easier for the user and/or the system to know what to do manually and automatically. Manifest granularity can get down to one manifest per component.

Conventionally, many more files are installed than what are actually needed. The manifest allows installing only those files that are needed. This improves at least performance and security. Software dependencies are defined in the manifest 607. At the application level, the dependencies can be specific to a single machine and define component relationships and the hardware resources. A computer can be described by a manifest, for example, the application should be deployed on a dual-processor machine of a specific manufacturer, or interface to a 4-processor machine. This manifest 607 describes the processor, memory, drives, etc., to the level of hardware granularity needed for the implementation. Thus, management can be more proactive then reactive, as in conventional systems. A hard disk failure can be determined to be caused by thermal failure, for example, where the system temperature is monitored over time, and the power supply rail voltages are monitored, but found to be sufficient.

The health model 601 is used to spawn the health manifest 608. The health manifest 608 is populated from the health model 601 using attribution and other tools. Events are not called out in the model 601, but in a resource file. A tool sweeps the resource files and attributed source code, and populates the health manifest 608. Failure states can be detected by watching for a predefined sequence of events or monitoring performance counter thresholds. Instructions can be provided to the system as to how to address such failure states. The health model is transformed into rules. The health manifest 608 includes ruletype event sequences with parameters such as event1, event2, time3, etc.

The configuration model 602 describes what settings are included and is transformed into the settings and assertions manifest 609 that provides instruction schema for the system to create the settings when the component is installed.

The administrative task model 603 is transformed into actions via the cmdlets and administration roles manifest 610. For example, if a data backup is required, the cmdlet is the actual code or URI used to facilitate the backup task. Where numerous administration tasks need to be performed, the manifest 610 provides the URI path to the those commands and perhaps to the code. The cmdlet can be processed through assertion on the code or may require external code. The administration role is another abstraction supporting, for example, multiple classes of users that manage this application or service, and the level of control they each can exercise. This associates with role-based access. Metadata is required that describes the roles of the various users and their allowed capabilities. Roles cross all aspects of the system—who is allowed to install, who can change monitoring, who can look at health, who can resolve alerts, who can take these various actions, etc.

The task model 603 defines what the developer thinks the administrator should do, as expressed in the manifest 610, and customized by the operations teams for their environment. These customizations can be done at the class level and instance level. Changes can be made in the manifest at the class level, at the instance level, and changes can be made directly at runtime. A very powerful feature of the disclosed model-based management architecture is that capabilities can first be described at the class level, whereas at runtime, access is to the instance space.

The architecture model 604 surfaces the distributed components manifest 611 and the deployment manifest 612. Network connections between machines, hardware requirements, are covered here, for example. The deployment manifest 612 supports at least applications comprising web servers, middle tier servers, and database servers, and includes frontend/backend applications, network connectivity between the two applications, and describes the relationships between individual nodes. Deployment time creates instances of those described in the overall architecture model 604.

The performance and security models (605 and 606) each support corresponding manifests (not shown) that describe those related functions and operations.

Returning to the employment of machine-based learning, a classifier can be used to select and dynamically generate manifests of selected portions of the model code based on requirements during, for example, first deployment. Default models can be automatically generated using more attribution or less attribution. Over time, as system operational information becomes available, this information can be analyzed such that the level of granularity of the manifest can be adjusted to, for example, more closely monitor the system in specific areas based on the latest data trends and logs. The updated manifest is then regenerated and employed as needed to more closely monitor the application or service.

If a manifest describes the default installation or recommended best practices from the manufacturer, an administrator may want to change things. For example, with respect to health rules the administrator may want to change a threshold from thirty to forty, or install components, or override a security policy. This can be done by creating a customized version of the manifest to override the manifest bundled by the manufacturer. A different version can be detected during installation, allowing a user the option to select the default manifest or the custom manifest. Alternatively, there can be a separate file the system reads that lists the overrides, which are then displayed for selection by the user to be applied to the default manifest or during installation such that the default settings are overridden.

With respect to the distributed applications, the administrator can more generally stipulate that he or she wants three of these, four of that, and six of those, all wired in this configuration. The administrator may customize the deployment manifest 612 accordingly for the given environment.

Figure 6C:
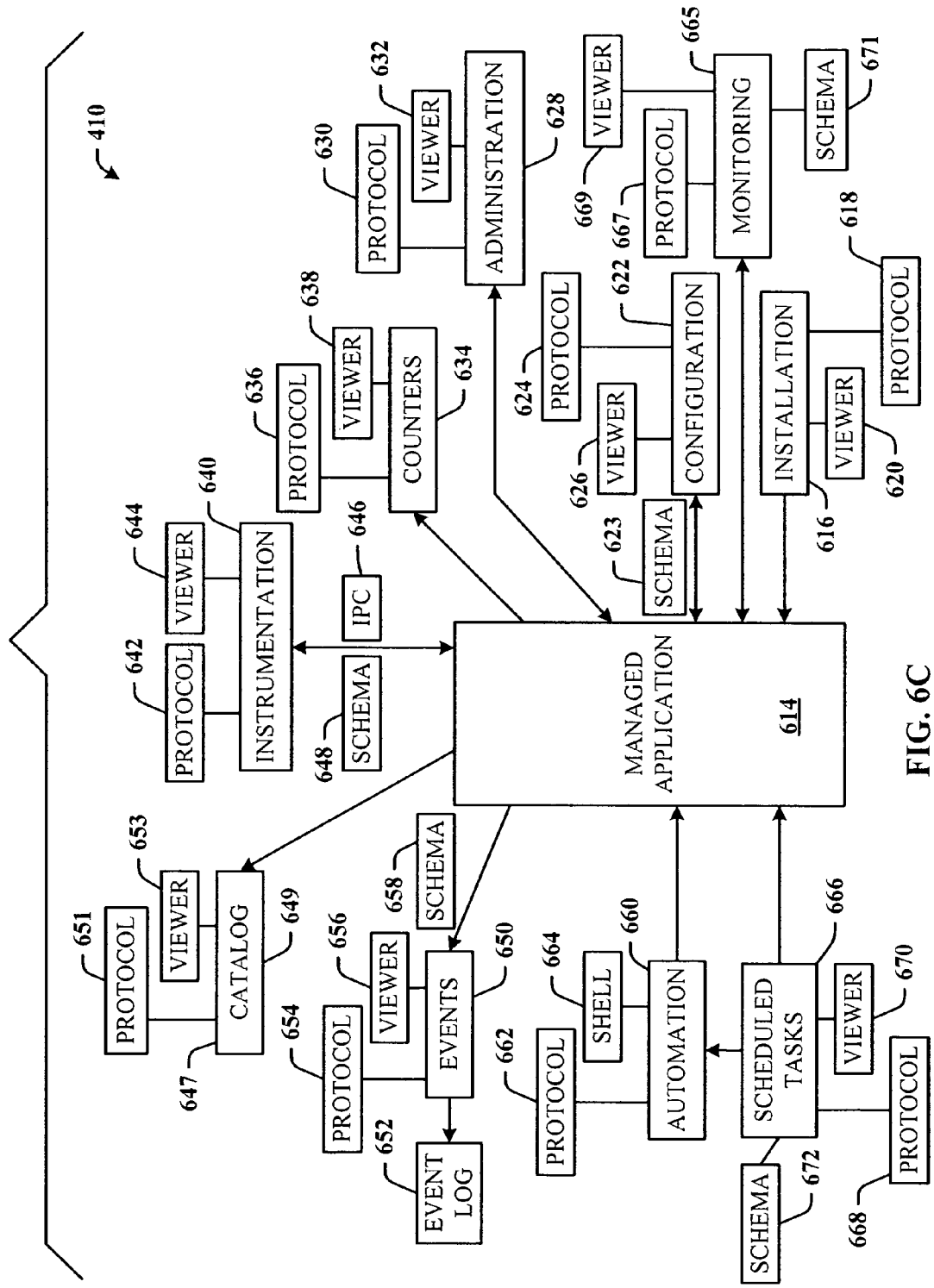
FIG. 6C illustrates a block diagram of core system APIs of the system component utilized for managing an application or service in accordance with the model-based management architecture.

Referring now to FIG. 6C, there is illustrated a block diagram of core system APIs of the system component 410 utilized for managing an application or service 614 in accordance with the model-based management architecture. The system component 410 includes the application or service 614 that is to be managed. The system 410 includes a number of APIs in cooperative communication for facilitating the model-based management. The system 410 is comprised of multiple services that are configured by information within an application manifest (described with respect to FIG. 6B).

The system 410 consists of the services necessary to ensure availability of an application and uses the desired states expressed in the manifest component 408 and modified by the administrator to perform the following: installation to verify dependencies and install only the necessary files, settings, and security; event subscriptions, to subscribe to events and to forward as specified; polled instrumentation to periodically collect instrumentation and counters; and, synthetic transactions or simulating user transactions. One of the best ways to determine if an application is available and performing as expected (the desired state) is for the monitoring system to use the application as if it were a user. This is active monitoring. A potential second way is active monitoring of real user transactions, and reporting aggregate data up to the system for analysis. These steps close the loop and show that internal application data is not sufficient. Model-based management also works outside the application.

The system 410 uses the desired states expressed in the manifest component 408 to also perform task scheduling for automatic task management; role-based access to restrict access to program functions; monitoring to detect problems, diagnose root causes, take corrective actions, and notify the system administrator when intervention is necessary; and, central configuration to customize policy for the above and apply to many machines.

There is provided an installation API 616 in communication with the application 614 to facilitate installation of the application, application updates, and patches. The installation API 616 takes the manifest assemblies via the code and instantiates the assemblies, by instructing the system to install this component, this manifest, and this version, on this machine. The installation API 616 has associated therewith a protocol 618 and a viewer 620. The protocol 618 facilitates communicating API-related data with other components of the system 410. The viewer 620 displays data related to the installation API 616. The installation API 616 not only facilitates installation on a single machine, but also for distributed applications or services involving both local and remote systems, as well as for hardware provisioning and abstraction. For a distributed data center environment, it is important to be able to abstract the hardware system generally, and to a finer granularity, to a specific machine abstraction. A protocol, as contemplated herein with respect to an API, is the rules that govern the transmission and receipt of that API-related data. The viewer 620, as understood in this description, is a program that displays data related to the API, here the installation API 616. The API data includes but is not limited to sound files, video files, for example, and other types of data files.

The system 410 includes a configuration API 622 in communication with the application 614 to facilitate configuring the application 614. The configuration API 622 has associated therewith a schema 623, a protocol 624 and a viewer 626. The schema 623 defines the structure and contents of the data passed between the API 622 and the application 614. The protocol 624 facilitates communicating API-related data with other components of the system 410. The viewer 626 displays data related to the configuration API 622.

There is also included an administration API 628 that facilitates many-to-one administration for distributed environments. The API 628 communicates with the managed application 614 and also remote systems (not shown). The API 628 has an associated protocol 630 and a viewer 632.

The system 410 includes a performance counter API 634 in communication with the application 614 to facilitate tracking counter variables that are used in managing the application 614. The counter API 634 has associated therewith a protocol 636 and a viewer 638. The protocol 636 facilitates communicating API-related data with other components of the system 410. The viewer 638 displays data related to the counter API 634. Performance counters are exposed by the application 614 and publishes the counters through the viewer 638.

There is provided an instrumentation API 640 in communication with the application 614 to facilitate configuring instrumentation and the passing of instrumentation data with the application 614. The instrumentation API 640 has associated therewith a protocol 642 and a viewer 644 through which the instrumentation is exposed. The protocol 642 facilitates communicating API-related data with other components of the system 410. The viewer 644 displays data related to the instrumentation API 640. The instrumentation API 640 communicates with the managed application 614 via IPC (InterProcess Communication) 646. IPC is the automatic exchange of data between one program and another, either within the same computer or over a network. One example of an IPC function is performed when a user manually cuts and pastes data from one file to another using a clipboard. The counters are always published via shared memory, while the instrumentation is delivered on demand. The instrumentation API 640 also includes a schema 648 that describes the surface of the instrumentation classes in manner similar to an events schema. There may also be included an instrumentation log (not shown); however, many administrators prefer to utilize an event log.

The system 410 includes a catalog 647 that is the store that keeps track of and caches component and mode information. This mode information comes from the manifests at install, and parts are dynamic and updated at runtime. The catalog 647 includes a catalog API and provides access to events, counters, instrumentation, and configuration data, to name just a few types of the data stored therein. Access to the catalog 647 is facilitated by a protocol 651 and viewer 653. A central configuration database contains a rolled up or aggregate view of the catalog across multiple managed nodes.

The system 410 includes an events API 650 in communication with the application or service 614 to facilitate implementing and tracking events that are used in managing the application 614. The events API 650 interfaces to an event log 652 that serves as a store for all events that occur. The events API 650 has associated therewith a protocol 654 and a viewer 656. The protocol 654 facilitates communicating API-related data with other components of the system 410. The viewer 656 displays data related to the events API 650. Communications with the application 614 is in accordance with an events schema 658 that defines the structure and contents of the data passed therebetween. The events are published as they are described or happen. The schema describes the surface of the event.

The system 410 includes an automation API 660 in communication with the application 614 to facilitate automating procedures that might normally be done interactively with the application 614. The automation API 660 has associated therewith a protocol 662 and a shell 664. The protocol 662 facilitates communicating API-related data with other components of the system 410. The shell 664 provides a user interface to the automation API 660 to facilitate user interaction therewith for entering and displaying data related to the automation processes and user control of the automation processes.

The system 410 further includes a scheduled tasks API 666 in communication with both the application 614 and the automation API 666. The scheduled tasks API 666 facilitates scheduling jobs or programs for at least the automation API 660 and the managed application 614. It maintains a list of jobs to be run and allocates resources accordingly. The scheduled tasks API 666 has associated therewith a protocol 668 and a viewer 670. The protocol 668 facilitates communicating API-related data with other components of the system 410. The viewer 670 displays data related to the scheduled tasks API 666. A task schema 672 defines the structure and contents of the data passed between the tasks API and other components.

Automation and tasks data is received from the task and cmdlets models. These features can be automated through the management shell either locally or remotely. The scheduling system can run these, e.g., a backup at 3 AM.

Figure 6D:
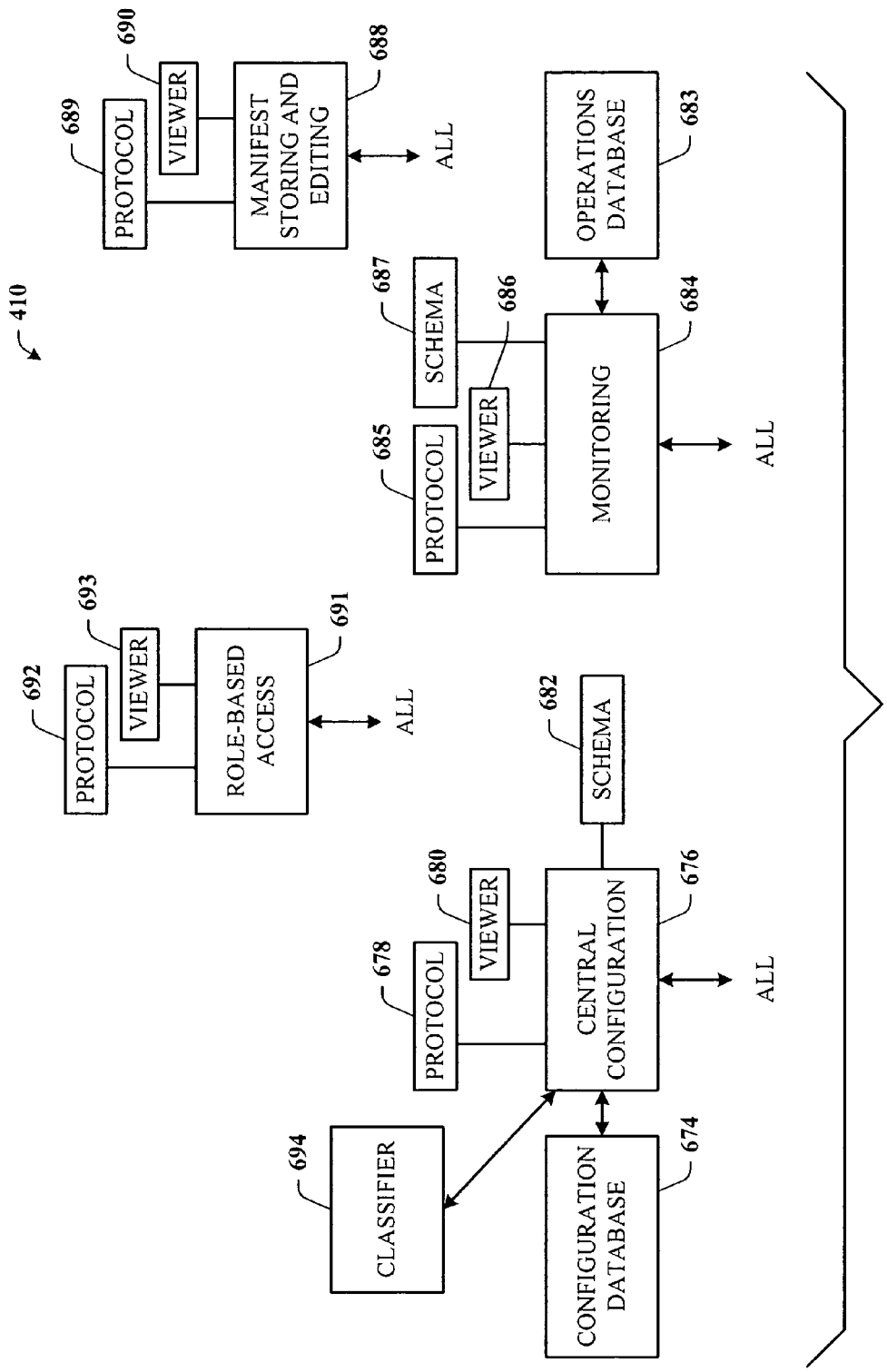
FIG. 6D illustrates a block diagram of management-related APIs of the system component of the model-based management architecture.

It is to be appreciated that components described in FIG. 6C can represent those of a local implementation, while the components of FIG. 6D can represent those associated with a distributed implementation such that analysis occurs across many machines and software systems. Thus, in a distributed implementation, the components of FIG. 6D communicate with at least one of the local systems of FIG. 6C, but typically a plurality of such local implementations in a wired and/or wireless regime. In the local implementation, the system 410 can also include any or all of the components of FIG. 6D, including a local monitoring service API 665. The local monitoring service API 665 also includes a protocol 667, a viewer 669, and schema 671, each of which facilitates functionality similar to such components of other APIs. In a distribute implementation, the local monitoring service 665 then passes monitoring information to the distributed monitoring service, described hereinbelow.

Referring now to FIG. 6D, there is illustrated a block diagram of management-related APIs of the system component 410 of the model-based management architecture. There is provided a configuration database subcomponent 674 to which access and control is provided via a central configuration API 676. The central configuration API 676 interfaces with all subcomponents of the system 410, and has associated therewith a protocol 678 and a viewer 680 for communication and interaction and, a schema component 682 that describes the shape of the configuration settings and attributes, such as assertions and default values. The protocol 678 facilitates communicating API-related data with other components of the system 410.

There is also provided an operations database subcomponent 683 that serves as a repository for operations-related data of the management system, e.g., reporting, current state, and historical data. A monitoring API 684 interfaces to the operations database 683 and all subcomponents of the model-based management system, and further has associated therewith a protocol 685, a viewer 686, and a schema 687. The protocol 685 facilitates communicating API-related data with other components of the system 410. The viewer 686 displays data related to the monitoring API 684. The schema 687 provides the definition for the entire operations database 683 at least with respect to the structure and type of contents that each data element within the structure can contain.

Central configuration can touch all of the APIs, and is used by the administrator to set configuration details, which can include details for the distributed application scenario, such as on what machines should the application be installed. Configuration also includes monitoring configuration. For example, all machines must exhibit no less than 80% CPU utilization for five minutes. Thus, the monitoring system uses the configuration system. Monitoring is how the administrator ensures via the management system that the application is behaving, configured, and installed per the model. It also includes ensuring expected functionality, the desired amount of security, performing properly, and delivery the data as expected for the users. Thus, monitoring crosses all of those domains. The general process is to install, configure, run tasks on demand, consume events, provide instrumentation, configuration, and store data and results. The health manifest provides the working instructions to the monitoring system in the form of rules that are the instructions to the monitoring system. In general, the manifest contains the runtime instructions, and the runtime implements the desired state.

The monitoring service is both a local service, as well as a central or distributed mechanism. For a distributed implementation, health includes that of the local machine as well as the relationships between the local and remote machines. For example, given a cluster of ten machines, as long as six are functioning properly, the system is considered to be healthy. However, if no more than five machines are running, the system health status degrades to a cautionary state. If no more than four machines are running, the system health can be considered in a failure state. Hardware abstraction facilitates bringing one or more backup systems or applications/services online if one or more cluster machines fail or go offline. Thus, a pool of idle or shared resources can be controlled based upon instructions. This feature is particularly useful in a data center environment. Automated actions can be implemented to ensure that the system maintains optimum or at least a minimum functionality.

One aspect of the model-based management architecture allows a developer to author a large number of rules that express criteria that must be met for a system to be considered healthy. The monitoring API 684 includes a rules runtime engine that facilitates implicit concurrent processing of the rules. The rules engine receives input instructions that express the rules as an intermediate form, which rules are expressed using a rules definition language (RDL). The rules engine also receives configuration data from the configuration database 674 that is used to instantiate the rule code. A translator reads the input instructions and transforms them into a parallel execution form. The runtime engine reads the translated instructions and facilitates parallel execution. The rule code is instantiated by loading the configuration data into the runtime engine that specifies which rules to run, as well as the parameters required to run the rule. Rule parameters can be changed at runtime, such as enabling rules that have a heavy system impact only when a problem has been detected. Thus, the rules are dynamic, as well as thresholds, that also can be changed accordingly. The monitoring API 684 also connects to all subcomponents of the system 410.

There is also provided a manifest storing and editing service 688 for use by the administrator. The manifest service 688 has associated therewith a protocol 689 and a viewer 690 to expose these manifest functions to the administrator. The manifest service 688 feeds the manifests to the administrator via the protocol 689 and viewer 690, allowing the administrator to view and change the manifests before installation. The manifest service 688 also facilitates versioning of the manifests according to updates and customizations.

There is also provided a role-based access API 691 that interfaces to all subcomponents of the model-based management system, and further has associated therewith a protocol 692 and a viewer 693. The protocol 692 facilitates communicating API-related data with other components of the system 410. The viewer 693 displays data related to the role-based API 691. This API 691 is illustrated at a level above the monitoring and configuration components to provide overall administration of access to the various components and aspects of the model-based management system. It is not necessary that the role-based access API 691 include the protocol 692 and a viewer 693, since these functions can be facilitated by other components of the system 410.

The system also includes the classifier 694 for machine-based learning and control. As indicated hereinabove, the classifier 694 can be employed in many ways to enhance system performance and health, to name just a few. To facilitate machine-based learning, the classifier 694 interfaces with central configuration service 676 such that all components of the system may be accessed and its data used.

Figure 6E:
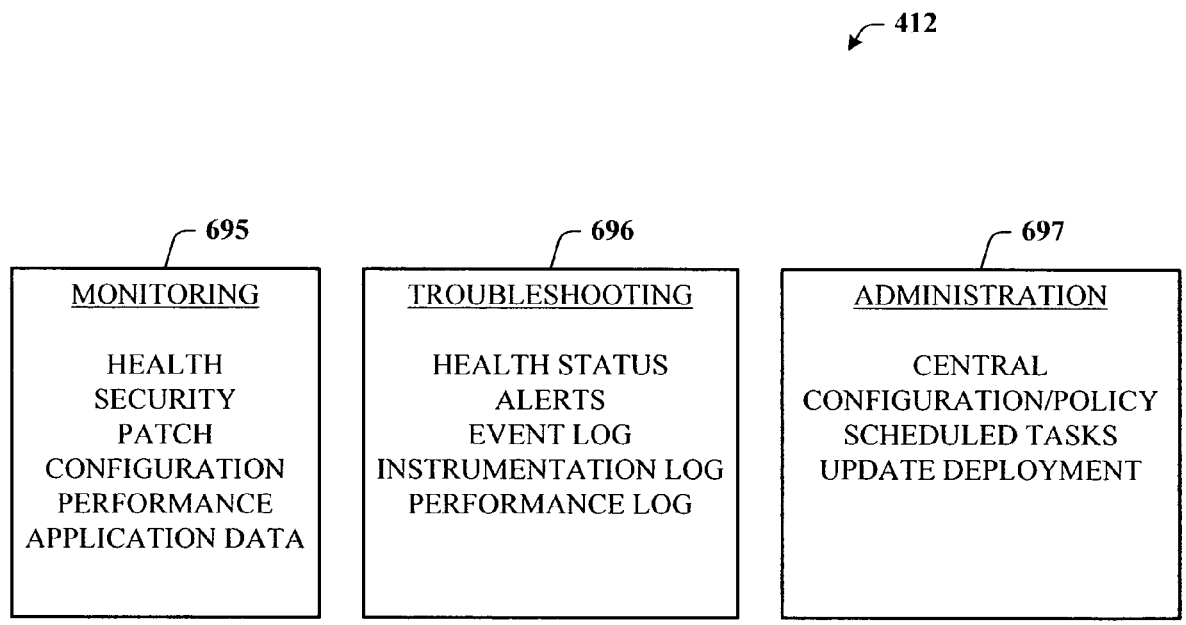
FIG. 6E illustrates principal subcomponents of the tasks component of the model-based management architecture.

Referring now to FIG. 6E, there is illustrated principal subcomponents of the tasks component 412 of the model-based management architecture. The tasks are described through the administration task model. The tasks fall into three subcomponents: a monitoring subcomponent 695, a troubleshooting subcomponent 696, and an administration subcomponent 697.

The tasks for the monitoring subcomponent 695 include overseeing health, security, patches, configuration, performance, and application data. The tasks for the troubleshooting subcomponent 696 include diagnosing a health state, processing alerts, and updating event, instrumentation, and performance logs. The tasks of the administration subcomponent 697 include central configuration/policy, scheduling, and update deployment. Administration includes not only management of a single system by also managing many machines, applications, and systems, policies, backup times, changes, and updates, for example.

URIs are employed in the model-based management architecture to uniquely identify abstract or physical resources or collections of resources. A schema for a resource can be identified by the URI with a placeholder for the resource. The URI with placeholder is called a URI template. The catalog of the system relies on URI templates to describe instrumentation without referring to specific instances. URI templates allow probes to be identified and their characteristics understood without actually retrieving the probe for a particular instance. Protecting the capability to predefine instrumentation separately from instances makes the deployment and authoring of rules easier and the associated operating system manageable.

The model-based management framework employs the RDL to enable defining of rules for the purpose of monitoring the availability of software and hardware. Rules written in RDL are executed by the runtime engine as part of the monitoring service. The purpose of the RDL is to test assertions, enforce constraints using runtime information, make inferences, perform correlation, and communicate results of dynamic tests to other components. The RDL defines the rule type (i.e., class) while a separate XML (eXtensible Markup Language) document is used to create instances of the rule type by specifying the parameter values necessary for its instantiation. There is a schema for describing the sequence of steps the system should take for problem detection, diagnosis, resolution, verification, and alerting. This is what is described in the model, expressed in the manifest, and executed/managed by the monitoring system.

The model-based management framework employs events and update values of performance counters to indicate a health model (or status) of services, and tests or synthetic transaction, as indicated earlier. The health model 601 is a graphical and/or textual representation of how a service or component may fail, which helps an administrator to understand the significance of various events and performance counters of the service, and efficiently decide whether to take any action based on the observed instrumentation data. A developer builds the health model 601 with the corresponding files then generated from the model and source code attribution.

The health model 601 includes a description of the component relationships, in addition to the dependencies. Depending upon the context of a detected problem, the system can walk the relationship tree and attempt to determine root cause based upon the health of other components. This approach is backed by the model and manifest.

Figure 7:
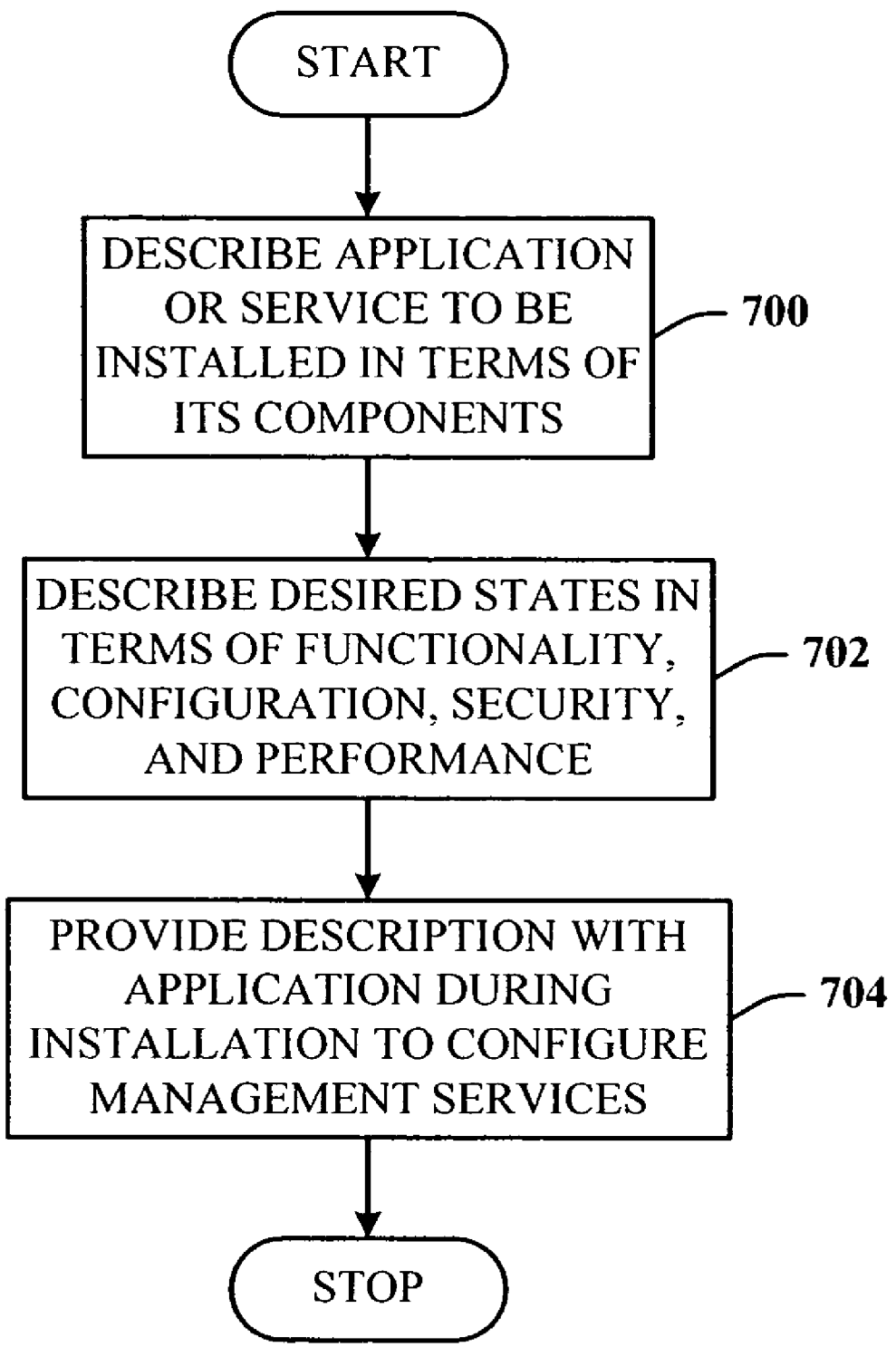
FIG. 7 illustrates a flow chart of a process of model-based management.

Referring now to FIG. 7, there is illustrated a flow chart of a process of model-based management. At 700, the application or service to be installed is described in terms of its components. At 702, the application or service is described in the desired states in terms of functionality, configuration, security, and performance. At 704, the description is provided along with the application or service during installation, such that the description is used by the system to configure management services of the system. The process then reaches a Stop block.

Figure 8:
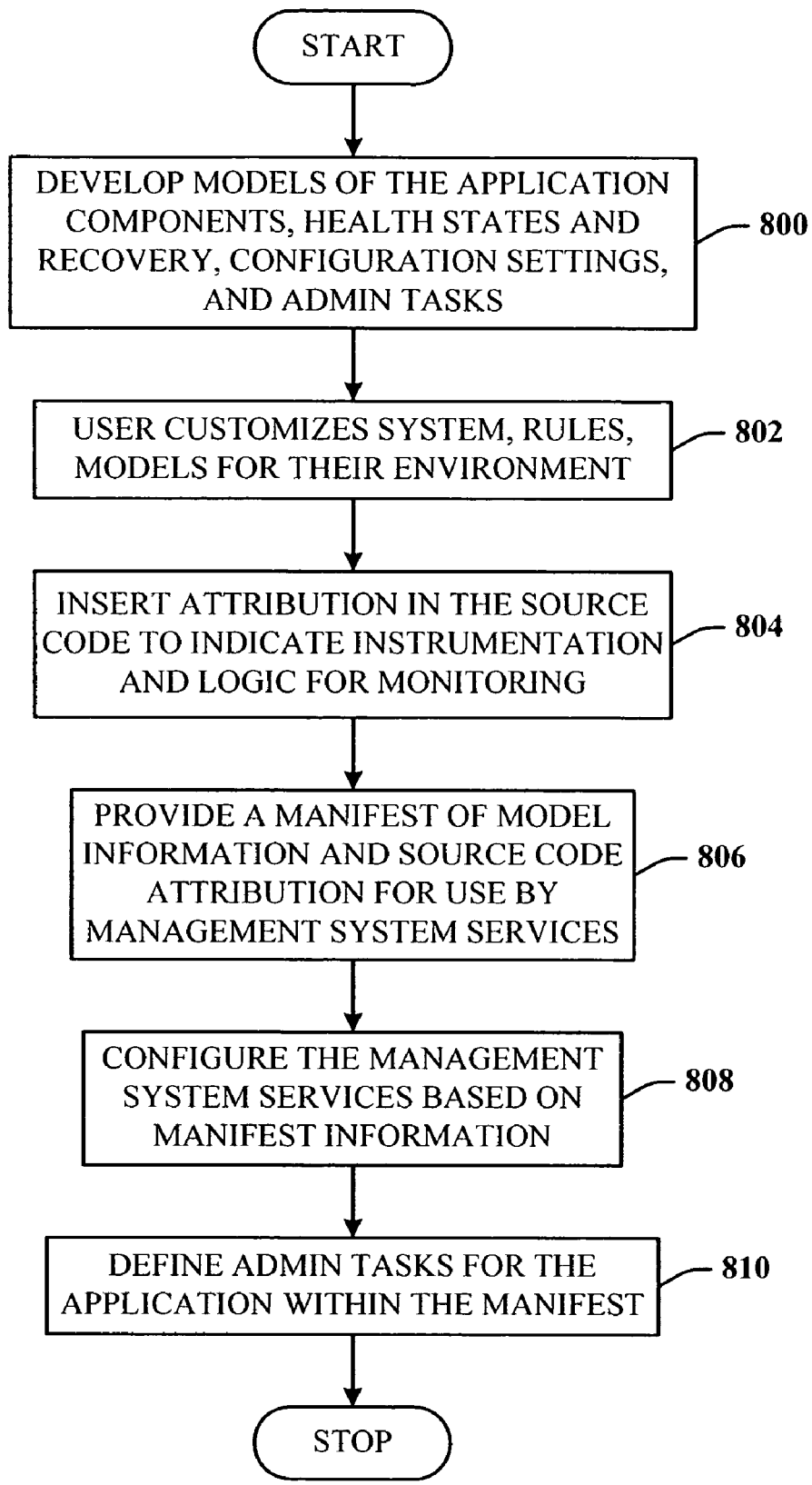
FIG. 8 illustrates a more detailed flow chart of a process of implementing the model-based management.

Referring now to FIG. 8, there is illustrated a more detailed flow chart of a process of implementing the model-based management. At 800, models are developed for the application components, health states and recovery, configuration settings, and admin tasks. At 802, a user customizes the system/rules/models according to the environment. At 804, attribution is inserted into the source code to indicate instrumentation and logic for monitoring. At 806, a manifest is provided of model information and source code attribution for use by the management system services. The manifest is provided for use by the management system services in machine-readable form. At 808, one or more of the management system services are configured based on the manifest information. At 810, administrative tasks are defined for the application within the manifest such as registering cmdlets with the system, setting up schedules, etc. The process then reaches a Stop block.

Figure 9:
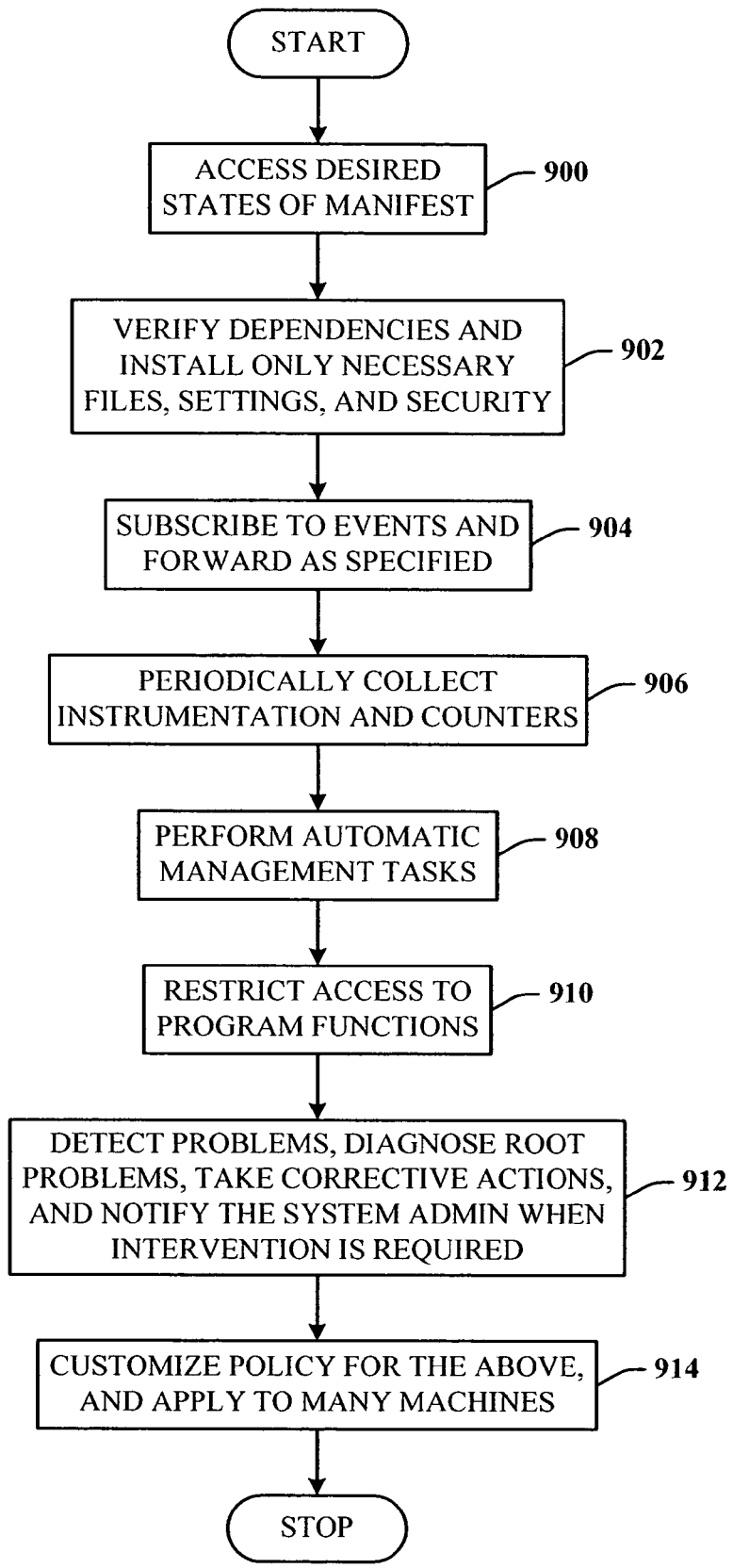
FIG. 9 illustrates a flow chart of a process of implementing desired states of the model-based management.

Referring now to FIG. 9, there is illustrated a flow chart of a process of implementing desired states of the model-based management. At 900, the desired states are accessed from the manifest. At 902, dependencies are verified and only the necessary files, settings, and security features are installed. At 904, events are subscribed to and forwarded, as specified in the manifest. At 906, instrumentation data and counter data is collected periodically, as well as tests and synthetic transactions performed. At 908, automatic management tasks are performed. At 910, access is restricted to program functions. However, this does not need to be included to facilitate model-based management. At 912, problems are detected, root problems diagnosed, corrective actions taken, and the system administrator notified when to intervene. At 914, policies for all of the above are customized for application to many other types of machines and systems. The process then reaches a Stop block.

Figure 10:
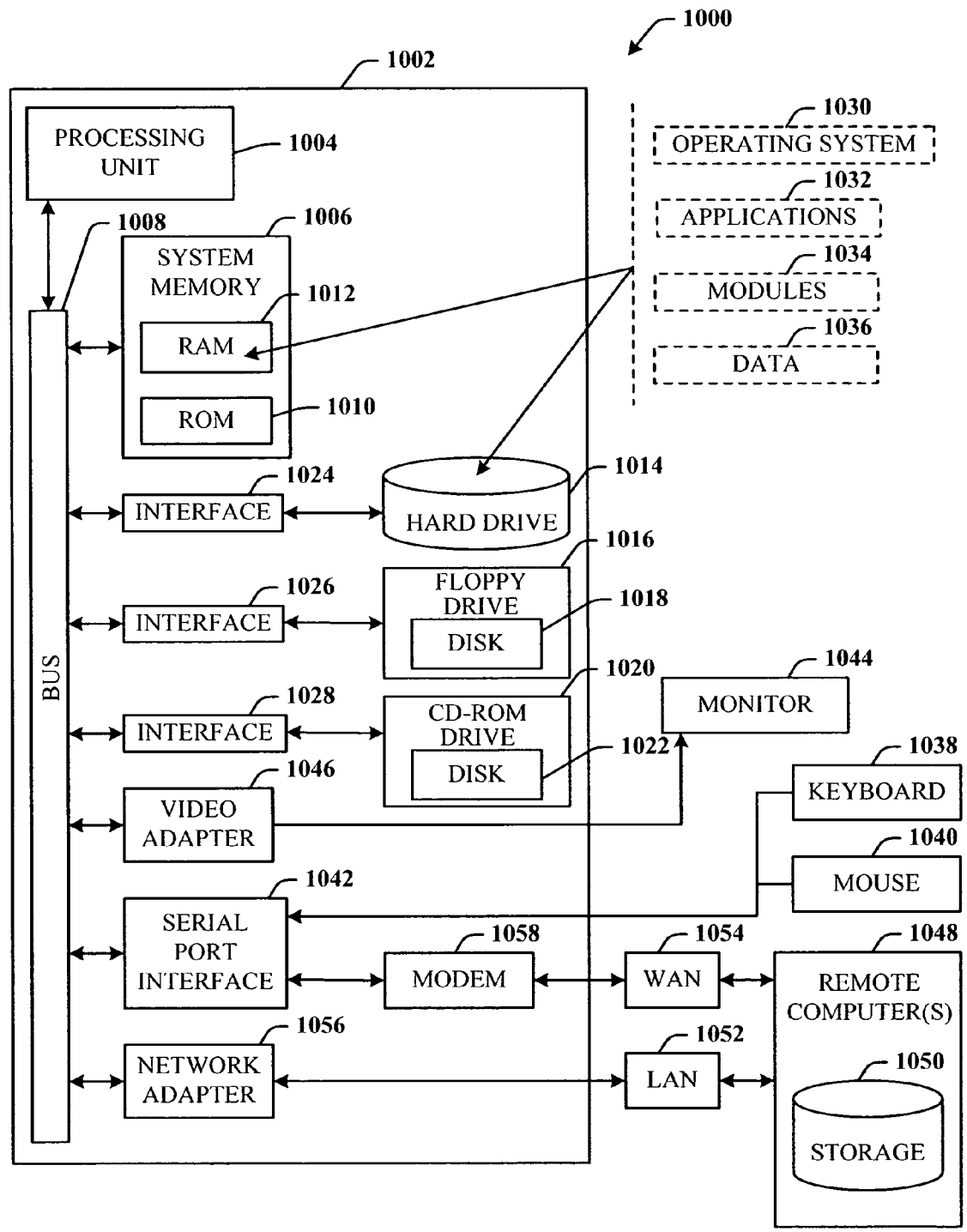
FIG. 10 illustrates a block diagram of a computer operable to execute the disclosed architecture.

Referring now to FIG. 10, there is illustrated a block diagram of a computer operable to execute the disclosed architecture. In order to provide additional context for various aspects of the present invention, FIG. 10 and the following discussion are intended to provide a brief, general description of a suitable computing environment 1000 in which the various aspects of the present invention may be implemented. While the invention has been described above in the general context of computer-executable instructions that may run on one or more computers, those skilled in the art will recognize that the invention also may be implemented in combination with other program modules and/or as a combination of hardware and software. Generally, program modules include routines, programs, components, data structures, etc., that perform particular tasks or implement particular abstract data types. Moreover, those skilled in the art will appreciate that the inventive methods may be practiced with other computer system configurations, including single-processor or multi-processor computer systems, minicomputers, mainframe computers, as well as personal computers, hand-held computing devices, microprocessor-based or programmable consumer electronics, and the like, each of which may be operatively coupled to one or more associated devices. The illustrated aspects of the invention may also be practiced in distributed computing environments where certain tasks are performed by remote processing devices that are linked through a communications network. In a distributed computing environment, program modules may be located in both local and remote memory storage devices.

With reference again to FIG. 10, there is illustrated an exemplary environment 1000 for implementing various aspects of the invention that includes a computer 1002, the computer 1002 including a processing unit 1004, a system memory 1006 and a system bus 1008. The system bus 1008 couples system components including, but not limited to, the system memory 1006 to the processing unit 1004. The processing unit 1004 may be any of various commercially available processors. Dual microprocessors and other multi-processor architectures may also be employed as the processing unit 1004.

The system bus 1008 can be any of several types of bus structure that may further interconnect to a memory bus (with or without a memory controller), a peripheral bus, and a local bus using any of a variety of commercially available bus architectures. The system memory 1006 includes read only memory (ROM) 1010 and random access memory (RAM) 1012. A basic input/output system (BIOS) is stored in a non-volatile memory 1010 such as ROM, EPROM, EEPROM, which BIOS contains the basic routines that help to transfer information between elements within the computer 1002, such as during start-up. The RAM 1012 can also include a high-speed RAM such as static RAM for caching data.

The computer 1002 further includes a hard disk drive 1014, a magnetic disk drive 1016, (e.g., to read from or write to a removable disk 1018) and an optical disk drive 1020, (e.g., reading a CD-ROM disk 1022 or to read from or write to other high capacity optical media such as Digital Video Disk (DVD)). The hard disk drive 1014, magnetic disk drive 1016 and optical disk drive 1020 can be connected to the system bus 1008 by a hard disk drive interface 1024, a magnetic disk drive interface 1026 and an optical drive interface 1028, respectively. The drives and their associated computer-readable media provide nonvolatile storage of data, data structures, computer-executable instructions, and so forth. For the computer 1002, the drives and media accommodate the storage of broadcast programming in a suitable digital format. Although the description of computer-readable media above refers to a hard disk, a removable magnetic disk and a CD, it should be appreciated by those skilled in the art that other types of media which are readable by a computer, such as zip drives, magnetic cassettes, flash memory cards, digital video disks, cartridges, and the like, may also be used in the exemplary operating environment, and further that any such media may contain computer-executable instructions for performing the methods of the present invention.

A number of program modules can be stored in the drives and RAM 1012, including an operating system 1030, one or more application programs 1032, other program modules 1034 and program data 1036. All or portions of the operating system, applications, modules, and/or data can also be cached in the RAM 1012.

It is appreciated that the present invention can be implemented with various commercially available operating systems or combinations of operating systems.

A user can enter commands and information into the computer 1002 through a keyboard 1038 and a pointing device, such as a mouse 1040. Other input devices (not shown) may include a microphone, an IR remote control, a joystick, a game pad, a satellite dish, a scanner, or the like. These and other input devices are often connected to the processing unit 1004 through a serial port interface 1042 that is coupled to the system bus 1008, but may be connected by other interfaces, such as a parallel port, a game port, a universal serial bus ("USB"), an IR interface, etc. A monitor 1044 or other type of display device is also connected to the system bus 1008 via an interface, such as a video adapter 1046. In addition to the monitor 1044, a computer typically includes other peripheral output devices (not shown), such as speakers, printers etc.

The computer 1002 may operate in a networked environment using logical connections via wired and/or wireless communications to one or more remote computers, such as a remote computer(s) 1048. The remote computer(s) 1048 may be a workstation, a server computer, a router, a personal computer, portable computer, microprocessor-based entertainment appliance, a peer device or other common network node, and typically includes many or all of the elements described relative to the computer 1002, although, for purposes of brevity, only a memory storage device 1050 is illustrated. The logical connections depicted include a local area network (LAN) 1052 and a wide area network (WAN) 1054. Such networking environments are commonplace in offices, enterprise-wide computer networks, intranets and the Internet.

When used in a LAN networking environment, the computer 1002 is connected to the local network 1052 through a wired or wireless communication network interface or adapter 1056. The adaptor 1056 may facilitate wired or wireless communication to the LAN 1052, which may also include a wireless access point disposed thereon for communicating with the wireless adaptor 1056. When used in a WAN networking environment, the computer 1002 typically includes a modem 1058, or is connected to a communications server on the LAN, or has other means for establishing communications over the WAN 1054, such as the Internet. The modem 1058, which may be internal or external and a wired or wireless device, is connected to the system bus 1008 via the serial port interface 1042. In a networked environment, program modules depicted relative to the computer 1002, or portions thereof, may be stored in the remote memory storage device 1050. It will be appreciated that the network connections shown are exemplary and other means of establishing a communications link between the computers may be used.

The computer 1002 is operable to communicate with any wireless devices or entities operably disposed in wireless communication, e.g., a printer, scanner, desktop and/or portable computer, portable data assistant, any piece of equipment or location associated with a wirelessly detectable tag (e.g., a kiosk, news stand, restroom), and telephone. This includes at least Wi-Fi and Bluetooth™ wireless technologies. Thus, the communication may be a predefined structure as with conventional network or simply an ad hoc communication between at least two devices.

Wi-Fi, or Wireless Fidelity, allows connection to the Internet from a couch at home, a bed in a hotel room or a conference room at work, without wires. Wi-Fi is a wireless technology like a cell phone that enables such devices, e.g., computers, to send and receive data indoors and out; anywhere within the range of a base station. Wi-Fi networks use radio technologies called IEEE 802.8 (a, b, g, etc.) to provide secure, reliable, fast wireless connectivity. A Wi-Fi network can be used to connect computers to each other, to the Internet, and to wired networks (which use IEEE 802.3 or Ethernet). Wi-Fi networks operate in the unlicensed 2.4 and 5 GHz radio bands, with an 8 Mbps (802.11b) or 54 Mbps (802.11a) data rate or with products that contain both bands (dual band), so the networks can provide real-world performance similar to the basic 10BaseT wired Ethernet networks used in many offices.

The disclosed computer 1002 may also be employed with HiperLAN technology. HiperLAN is a set of wireless local area network (WLAN) communication standards primarily used in European countries. There are two specifications: HiperLAN/1 and HiperLAN/2, both of which have been adopted by the European Telecommunications Standards Institute. The HiperLAN standards provide features and capabilities similar to those of the IEEE 802.11 WLAN standards used in the U.S. and other adopting countries. HiperLAN/1 provides communications at up to 20 Mbps in the 5-GHz range of the radio frequency spectrum. HiperLAN/2 operates at up to 54 Mbps in the same RF band, and is compatible with 3G (third-generation) WLAN systems for sending and receiving data, images, and voice communications. HiperLAN/2 has the potential, and is intended, for implementation worldwide in conjunction with similar systems in the 5-GHz RF band.

Figure 11:
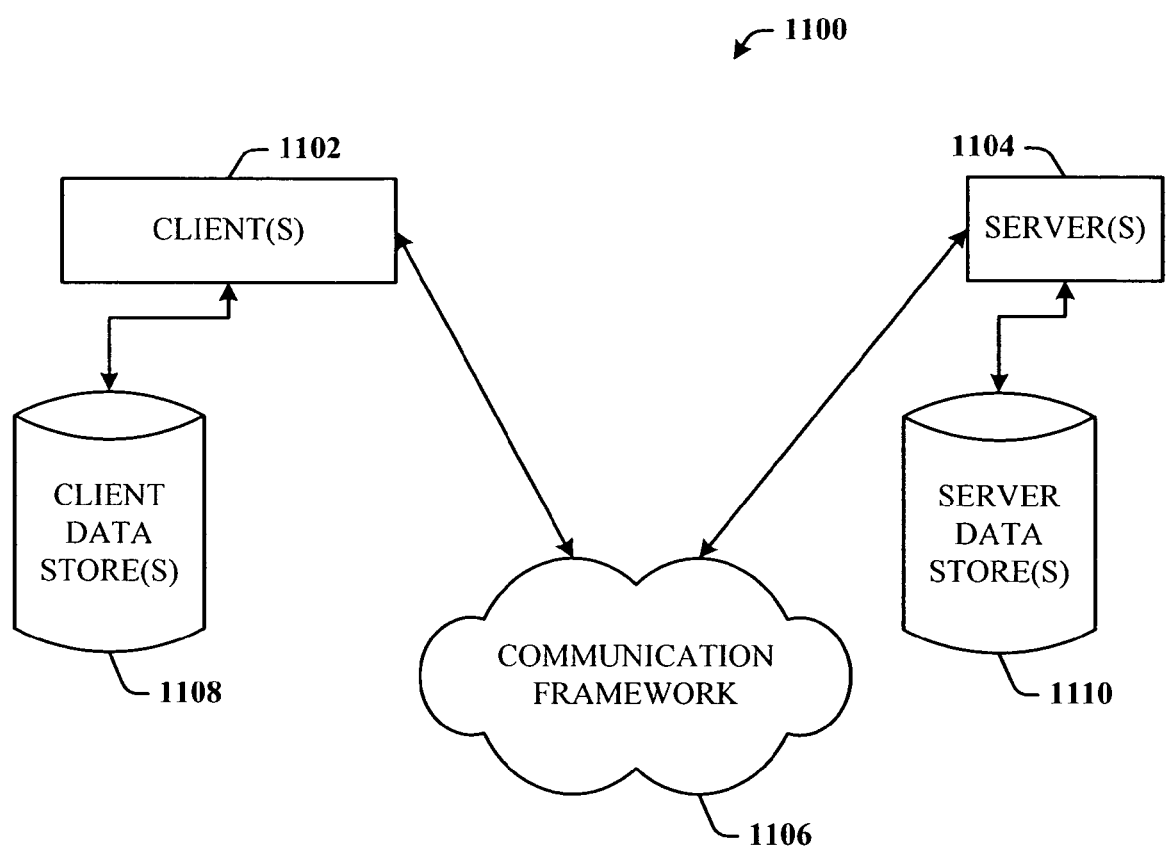
FIG. 11 illustrates a schematic block diagram of an exemplary computing environment in accordance with the present invention.

Referring now to FIG. 11, there is illustrated a schematic block diagram of an exemplary computing environment 1100 in accordance with the present invention. The system 1100 includes one or more client(s) 1102. The client(s) 1102 can be hardware and/or software (e.g., threads, processes, computing devices). The client(s) 1102 can house cookie(s) and/or associated contextual information by employing the present invention, for example. The system 1100 also includes one or more server(s) 1104. The server(s) 1104 can also be hardware and/or software (e.g., threads, processes, computing devices). The servers 1104 can house threads to perform transformations by employing the present invention, for example. One possible communication between a client 1102 and a server 1104 may be in the form of a data packet adapted to be transmitted between two or more computer processes. The data packet may include a cookie and/or associated contextual information, for example. The system 1100 includes a communication framework 1106 (e.g., a global communication network such as the Internet) that can be employed to facilitate communications between the client(s) 1102 and the server(s) 1104.

Communications may be facilitated via a wired (including optical fiber) and/or wireless technology. The client(s) 1102 are operably connected to one or more client data store(s) 1108 that can be employed to store information local to the client(s) 1102 (e.g., cookie(s) and/or associated contextual information). Similarly, the server(s) 1104 are operably connected to one or more server data store(s) 1110 that can be employed to store information local to the servers 1104.

What has been described above includes examples of the present invention. It is, of course, not possible to describe every conceivable combination of components or methodologies for purposes of describing the present invention, but one of ordinary skill in the art may recognize that many further combinations and permutations of the present invention are possible. Accordingly, the present invention is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A system comprising executable components embodied on a computer-readable storage medium that when executed on a processor facilitates representing a class of resources, comprising:
    a running application table indicating instrumented applications running on a host system;
    a probe member configured to define instrumentation information for a class of threads of the instrumented applications running on the host system, the probe member including:
        an instrumentation catalog storing schema information for a complex return type of the class of threads, the schema information describing instrumentation information to be provided for a specific thread in response to a probe of the specific thread; and
        a class identifier that uniquely represents the class of threads, the class identifier is a uniform resource identifier (URI) template that uses a single-character placeholder in place of a name of a specific thread of the class and is used to retrieve the schema information for the class of threads without retrieving instrumentation information for specific instances of the class of threads; and
    a instrumentation module configured to:
        convert the class identifier to a specific thread identifier in which the placeholder is replaced with a name of a specific instance of the class of threads;
        use the running application table and the specific thread identifier to retrieve instrumentation information consistent with the schema for the specific instance of the class of threads; and
        add the retrieved instrumentation information to a log file.

2. The system of claim 1, the class identifier is included as an entry in the instrumentation catalog, which entry associates information about the class identifier, including each of purpose, usage, values to use for placeholders, and a returned value.

3. The system of claim 1, the class identifier passes values to a method associated with instances.

4. The system of claim 1, the class identifier is configured and executed to return a list of all running instances of an associated application.

5. A system comprising executable components embodied on a computer-readable storage medium that when executed on a processor facilitates representing a class of resources, comprising:
    a running application table indicating instrumented applications running on a host system;
    a probe member configured to define instrumentation information for a class of threads of the instrumented applications running on the host system, the probe member including:
        a schema for the class of threads describing probe information that will be returned in response to a probe of a specific thread of the class of threads;
        a URI template that uniquely represents the class of threads and includes at least one single-character placeholder in place of a name of a specific thread within the class of threads, the URI template facilitating retrieval of information about the schema without retrieving any specific instances of threads within the class; and
    a instrumentation module configured to:
        convert the URI template representing the class of threads to a specific thread identifier in which the at least one placeholder is replaced with the name of a specific instance of the class of threads,
        use the running application table and the specific resource identifier to retrieve probe information consistent with the schema for the specific instance of the class of threads; and
        add the retrieved instrumentation information to a log file.

6. A computer system operating in accordance with claim 5.

7. A method of representing a class of resources, comprising:
    employing a processor executing computer-executable instructions stored on a computer-readablestorage medium to implement the following acts:
        building a running application table indicating instrumented applications running on a host system, each instrumented application having registered with running application table when the instrumented application started;
        representing a class of threads of the instrumented applications running on the host system with a URI template that includes at least one placeholder in place of a name of a specific thread;
        creating an entry for the URI template in an instrumentation catalog, the entry associating the URI template with a schema that describes management information that will be provided in response to a probe on a specific thread of the class of threads;
        processing the URI template to identify the schema without retrieving an instance of a specific thread associated with the class of threads;
        converting the URI template to a URI for a specific thread of the class of threads by replacing the at least one placeholder with a name of the specific thread;
        processing the URI for the specific resource to retrieve management information for the specific resource, the management information consistent with the schema; and
        adding the retrieved management information to a log file.

8. The method of claim 7, the URI template uniquely represents the class of threads.

9. The method of claim 7, further comprising employing at least two single-character placeholders in the URI template to access an instance within at least another instance.

10. The method of claim 7, further comprising employing at least two placeholders in the URI template to pass values to a method associated with an instance, at least a first one of the at least two placeholders represents an instance name and at least a second of the at least two placeholders represents a new value for a parameter associated with the instance.

11. A method of accessing data representative of a class of resources, comprising:
employing a processor executing computer-executable instructions stored on a computer-readable storage medium to implement the following acts:
building a running application table indicating instrumented applications running on a host system, each instrumented application having registered with running application table when the instrumented application started;
uniquely associating a URI template with a class of threads of the instrumented applications running on the host system, the URI template uses at least one single-character placeholder in place of a name of a specific thread;
associating the URI template with a schema representative of the class of threads, the schema specifying instrumentation information to be provided for an instance of the thread class in response to a probe of the instance;
processing the URI template to return information about the schema without returning instrumentation information for a specific thread;
substituting the at least one single-character placeholder with the name of a specific thread to yield a URI for the specific thread;
processing the URI for the specific thread to return instrumentation information for the specific thread in accordance with the schema; and
adding the retrieved instrumentation information to a log file.

12. The method of claim 11, the URI template is processed on a local system and accesses an associated thread class of a remote system.

13. The method of claim 11, further comprising employing at least two single-character placeholders in the URI template to pass values to a method associated with an instance of the thread class.

14. A computer-readable medium having computer-executable instructions for performing a method for representing a class of resources, the method comprising:
building a running application table indicating instrumented applications running on a host system, each instrumented application having registered with running application table when the instrumented application started;
uniquely associating a URI template with a class of threads of the instrumented applications running on the host system, the URI template uses at least one single-character placeholder in place of a name of a specific thread;
creating an association between the URI template and a schema for the thread class, the schema describing management information to be provided for a specific thread in the thread class in response to a probe of the specific thread;
processing the URI template to return data representative of the thread class without returning management information for a specific thread;
modifying the URI template to replace the at least one placeholder with a name of a specific thread in the thread class;
processing the modified URI template to return management data representative of the named specific thread, the management data consistent with the schema;
employing at least two placeholders in the URI template to pass values to a method associated with an instance of a specific thread in the thread class, a first of the at least two placeholders represents the name of the specific thread and a second of the at least two placeholders represents a new value for a parameter associated with the specific thread; and
adding the results of the method to a log file.

15. The method of claim 14, further comprising:
processing the URI template on a local system; and
accessing an associated resource class of a remote system.

16. A computer-readable medium having computer-executable instructions that facilitate representing a class of resources, the system comprising:
a running application table indicating instrumented applications running on a host system;
a probe member configured to define instrumentation information for a class of threads of the instrumented applications running on the host system, the probe member including:
an instrumentation catalog storing a schema for a complex return type of the class of threads, the schema defining management data to be provided for a specific instance of the class of threads in response to a probe of the specific instance; and
a class identifier that uniquely represents the class of threads, the class identifier includes a single-character placeholder in place of a specific thread name and facilitates identification of the management information for the class of threads without retrieving management information for a specific instance of a thread within the class; and
a instrumentation module configured to:
convert the class identifier to a specific thread identifier in which the placeholder is replaced with a name of a specific thread;
use the running application table and the specific thread identifier to retrieve management information for the named specific thread in accordance with the schema; and
add the retrieved management information to a log file.

* * * * *